(12) United States Patent
Marupaduga

(10) Patent No.: US 11,399,403 B1
(45) Date of Patent: Jul. 26, 2022

(54) ADDITION THRESHOLDS FOR WIRELESS ACCESS NODES BASED ON INSERTION LOSS

(71) Applicant: T-MOBILE INNOVATIONS LLC, Overland Park, KS (US)

(72) Inventor: Sreekar Marupaduga, Overland Park, KS (US)

(73) Assignee: Sprint Communications Company LP, Overland Park, KS (US)

( * ) Notice: Subject to any disclaimer, the term of this patent is extended or adjusted under 35 U.S.C. 154(b) by 100 days.

(21) Appl. No.: 17/076,120

(22) Filed: Oct. 21, 2020

(51) Int. Cl.
*H04B 7/022* (2017.01)
*H04B 7/06* (2006.01)
*H04B 17/24* (2015.01)
*H04B 17/382* (2015.01)
*H04W 24/02* (2009.01)
*H04W 24/10* (2009.01)
*H04W 28/02* (2009.01)
(Continued)

(52) U.S. Cl.
CPC ............ *H04W 76/15* (2018.02); *H04B 7/022* (2013.01); *H04B 7/0691* (2013.01); *H04B 17/24* (2015.01); *H04B 17/382* (2015.01); *H04W 24/02* (2013.01); *H04W 24/10* (2013.01); *H04W 28/0236* (2013.01); *H04W 28/0815* (2020.05); *H04W 28/0819* (2020.05); *H04W 28/0933* (2020.05); *H04W 36/0066* (2013.01); *H04W 36/0069* (2018.08); *H04W 76/27* (2018.02); *H04W 84/04* (2013.01); *H04W 88/06* (2013.01); *H04W 88/10* (2013.01); *H04W 92/02* (2013.01); *H04W 92/10* (2013.01); *H04W 92/20* (2013.01)

(58) Field of Classification Search
CPC ... H04B 7/02–17; H04B 17/0082–3913; H04J 11/0023–0093; H04J 2011/0003–0096; H04L 5/0001–0098; H04W 8/22–245; H04W 24/02–10; H04W 28/02–26; H04W 36/0005–385; H04W 48/02–20; H04W 52/02–60; H04W 60/005–06; H04W 72/005–14; H04W 74/002–008; H04W 76/10–50; H04W 84/005–22; H04W 88/005–188; H04W 92/02–24
See application file for complete search history.

(56) References Cited

U.S. PATENT DOCUMENTS 9,119,120 B2   8/2015   Yeh et al.
9,276,329 B2   3/2016   Jones et al.
(Continued)

*Primary Examiner* — Timothy J Weidner

(57) ABSTRACT

A primary access node adds a secondary access node to deliver wireless communication service to a User Equipment (UE). The primary access node comprises baseband circuitry and a radio. The radio wirelessly receives a measurement report from the UE that characterizes a radio metric for the secondary access node. The baseband circuitry determines insertion loss for the secondary access node and an add threshold for the secondary access node based on the insertion loss. The baseband circuitry determines an add value for the secondary access node based on the radio metric. When the add value exceeds the add threshold, the baseband circuitry transfers network signaling to the secondary access node to serve the UE and transfers user signaling to the UE over the radio. The UE attaches to the secondary access node and the secondary access node delivers the wireless communication service to the UE.

20 Claims, 11 Drawing Sheets

(51) Int. Cl.
  *H04W 28/08* (2009.01)
  *H04W 36/00* (2009.01)
  *H04W 76/15* (2018.01)
  *H04W 76/27* (2018.01)
  *H04W 84/04* (2009.01)
  *H04W 88/06* (2009.01)
  *H04W 88/10* (2009.01)
  *H04W 92/02* (2009.01)
  *H04W 92/10* (2009.01)
  *H04W 92/20* (2009.01)

(56) References Cited

U.S. PATENT DOCUMENTS

| | | |
|---|---|---|
| 9,526,091 B2 | 12/2016 | Chou |
| 9,570,804 B2 | 2/2017 | Shang et al. |
| 9,653,818 B2 | 5/2017 | Mohammadian et al. |
| 10,038,246 B2 | 7/2018 | Feng et al. |
| 10,117,113 B2 | 10/2018 | Braun et al. |
| 2016/0192181 A1* | 6/2016 | Choi .................... H04W 24/02 |
| 2022/0060955 A1* | 2/2022 | Marupaduga ......... H04W 28/08 |

* cited by examiner

ADDITION THRESHOLDS FOR WIRELESS ACCESS NODES BASED ON INSERTION LOSS

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes that exchange wireless signals over frequency channels with the wireless user devices using wireless network protocols. Exemplary wireless network protocols include Institute of Electrical and Electronic Engineers (IEEE) 802.11 (WIFI), Long Term Evolution (LTE), Fifth Generation New Radio (5GNR), Millimeter Wave (MMW) and Low-Power Wide Area Network (LP-WAN). In some examples, both LTE and 5GNR networks serve the same wireless user device at the same time with an integrated data service called dual-connectivity. A wireless access network that provides dual connectivity simultaneously serves a single user device over multiple wireless links.

An Evolved Universal Terrestrial Radio Access Network Dual Connectivity (EN-DC) node comprises both a primary access node and one or more secondary access nodes. An EN-DC user device initially attaches to the primary access node in the EN-DC node. The primary access node transfers measurement instructions to the EN-DC user device that direct the EN-DC user device to measure signal strength for the secondary access nodes. The EN-DC user device receives the measurement instructions and measures the signal strength of the secondary access nodes. The EN-DN user device reports the signal strength for the secondary access nodes to the primary access node. The primary access node determines if the secondary access nodes should be used to serve the EN-DC user device based on the reported signal strength. To determine if the secondary access nodes should be used, the primary access node compares received signal strengths for the secondary access nodes at the EN-DC user device to an addition threshold that is referred to as "B1". When the received signal strengths exceed the addition threshold, the primary access node adds the secondary access nodes and the secondary access nodes exchange user data with EN-DC user device.

Insertion loss in the secondary access nodes comprises the loss of signal power due to the baseband circuitry of the secondary access nodes and the antenna elements of the secondary access nodes. The increase in insertion loss decreases the ability of the secondary access nodes to provide wireless communication service to the EN-DC user device. With the advent of massive Multiple Input Multiple Output (MIMO) communications, the number of antenna elements in the secondary access nodes has dramatically increased. Consequently, the insertion loss for the secondary access nodes has also increased. The primary access node is faced with the problem of trying to add the optimal secondary access nodes for the EN-DC user device given the increase in insertion loss for the secondary access nodes. Unfortunately, the primary access node does not effectively and efficiently add secondary access nodes given the increase in insertion loss.

TECHNICAL OVERVIEW

A primary access node is configured to add a secondary access node to deliver wireless communication service to a User Equipment (UE). The primary access node comprises a radio and baseband circuitry. The radio wirelessly receives a measurement report from the UE that characterizes a radio metric for the secondary access node. The radio transfers the measurement report to the baseband circuitry. The baseband circuitry determines an insertion loss for the secondary access node. The baseband circuitry determines an add threshold for the secondary access node based on the insertion loss. The baseband circuitry receives and processes the measurement report and responsively determines an add value for the secondary access node based on the radio metric in the measurement report. The baseband circuitry determines when the add value exceeds the add threshold. When the add value exceeds the add threshold, the baseband circuitry transfers network signaling to the secondary access node to serve the UE. The baseband circuitry transfers user signaling to the radio. The radio wirelessly transfers the user signaling to the UE to attach to the secondary access node. The UE attaches to the secondary access node responsive to the user signaling. The secondary access node delivers the wireless communication service to the UE responsive to the network signaling.

DETAILED DESCRIPTION

Figure 1:
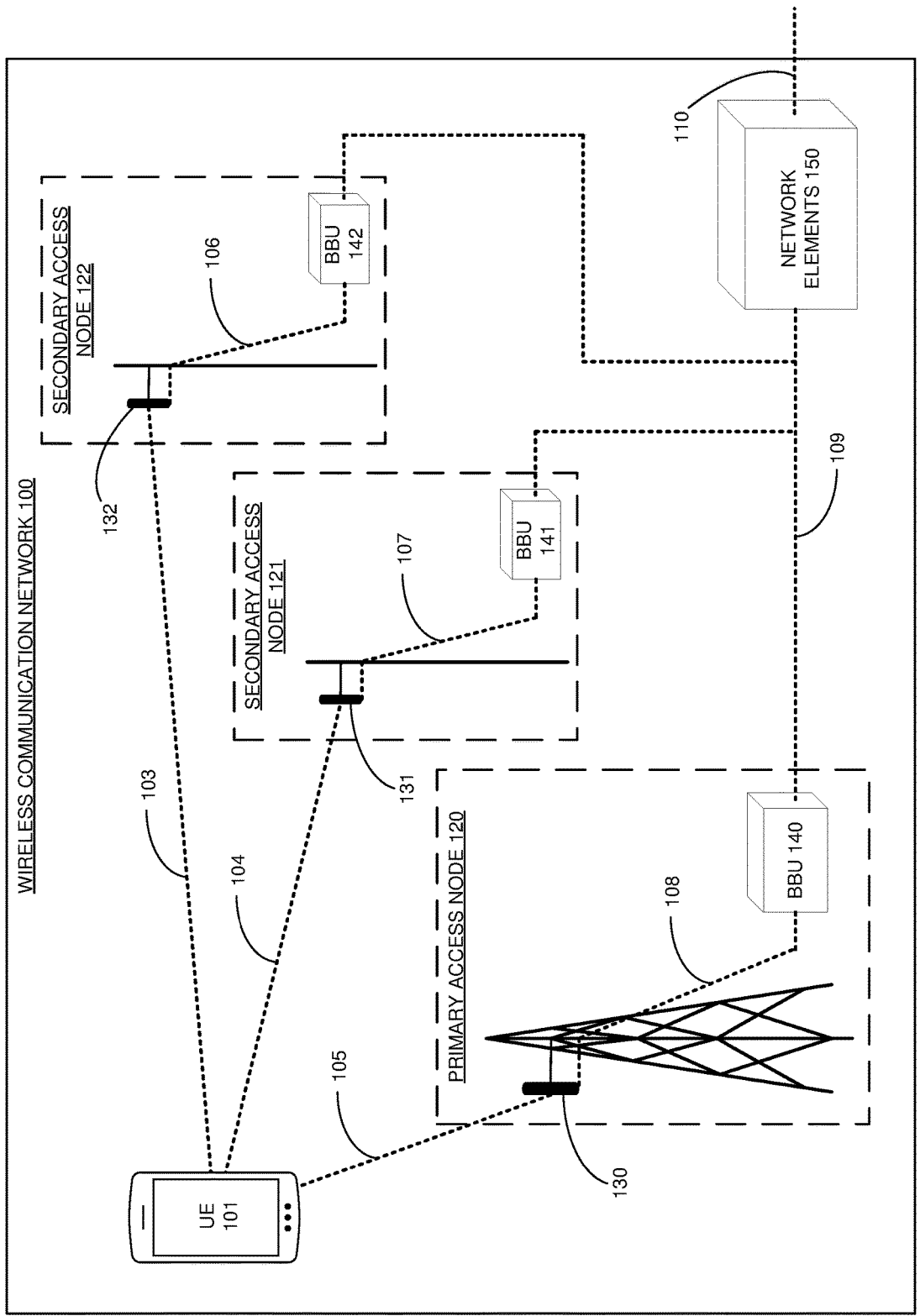
FIG. 1 illustrates a wireless communications network to serve a wireless User Equipment (UE) with a wireless communication service over multiple wireless links based on insertion loss.

FIG. 1 illustrates wireless communication network 100 to serve wireless User Equipment (UE) 101 with a wireless communication service over multiple wireless links based on insertion loss. Wireless communication network 100 provides wireless data services to UE 101 like machine-control, internet-access, media-streaming, social-networking, and/or some other type of wireless networking product. Wireless communication network 100 comprises wireless UE 101, links 103-110, primary access node 120, secondary access nodes 121-122, and network elements 150. Primary access node 120 comprises radio 130 and Baseband Unit (BBU) 140. Secondary access node 121 comprises radio 131 and BBU 141. Secondary access node 122 comprises radio 132 and BBU 142.

Various examples of network operation and configuration are described herein. In some examples, radio 130 wirelessly receives a measurement report from UE 101 that characterizes radio metrics for secondary access nodes 121-122. Radio 130 transfers the measurement report to BBU 140. BBU 140 determines an insertion loss for the secondary access nodes 121-122. Insertion loss comprises a loss in signal power between the baseband circuitry and antenna elements of access nodes 121-122. BBU 140 determines add thresholds for secondary access nodes 121-122 based on the insertion loss. BBU 140 tends to increase the add thresholds for secondary access nodes 121-122 as the insertion loss increases. BBU 140 receives and processes the measurement report and responsively determines add values for secondary access nodes 121-122 based on the radio metrics in the measurement report. BBU 140 determines when the add values exceed the add thresholds. When the add values exceed the add thresholds, BBU 140 transfers network signaling to secondary access nodes 121-122 to serve UE 101. BBU 140 transfers user signaling to radio 130. Radio 130 wirelessly transfers the user signaling to UE 101 to attach to secondary access nodes 121-122. UE 101 attaches to secondary access nodes 121-122 responsive to the user signaling. Secondary access nodes 121-122 deliver the wireless communication service to UE 101 responsive to the network signaling. Advantageously, primary access node 120 effectively and efficiently adds secondary access nodes 121-122 based on insertion loss to help drive UE 101 toward secondary access nodes that have lower insertion loss. Moreover, primary access node 120 controls the add thresholds based on insertion loss to prevent secondary access nodes with higher insertion loss from becoming overloaded with wireless UEs.

UE 101 and radios 130-132 comprise antennas, amplifiers, filters, modulation, analog/digital interfaces, microprocessors, software, memories, transceivers, bus circuitry, and the like. BBUs 140-142 and network elements 150 comprise microprocessors, memories, software, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network applications. The microprocessors retrieve the software from the memories and execute the software to drive the operation of wireless communication network 100 as described herein. Although UE 101 is depicted as a smartphone, UEs 101 might instead comprise a computer, robot, vehicle, or other data appliance with wireless communication circuitry.

Access nodes 120-122 comprise Fifth Generation New Radio (5GNR) gNodeBs, Millimeter Wave (MMW) access nodes, Fifth Generation Radio Access Technology (5G RAT) nodes, Evolved Universal Terrestrial Radio Access Network Dual Connectivity (EN-DC) nodes, Long Term Evolution (LTE) eNodeBs, WIFI hotspots, Low-Power Wide Area Network (LP-WAN) nodes, and/or some other wireless network apparatus. Access nodes 120-122 are geographically dispersed, however access nodes 120-122 may be collocated. Network elements 150 comprise User Plane Functions (UPFs), Access and Mobility Management Function (AMFs), System Architecture Evolution Gateways (SAE GWs), Mobility Management Entities (MMEs), and/or some other network apparatus. Access nodes are depicted as towers, but access nodes 120-122 may use other mounting structures or no mounting structure at all.

Wireless links 103-105 use over-the-air air electromagnetic frequencies in the low-band, mid-band, high-band, or some other portion of the electromagnetic spectrum. Wireless links 103-105 use protocols like 5GNR, LTE, MMW, Institute of Electrical and Electronic Engineers (IEEE) 802.11 (WIFI), LP-WAN, and/or some other format of wireless protocol. Links 106-110 use metal, glass, air, or some other media. Links 106-110 use IEEE 802.3 (Ethernet), Time Division Multiplex (TDM), Data Over Cable System Interface Specification (DOCSIS), Internet Protocol (IP), Hypertext Transfer Protocol (HTTP), Fifth Generation Core (5GC), 5GNR, LTE, WIFI, virtual switching, inter-processor communication, bus interfaces, and/or some other data communication protocols. Links 106-110 may comprise intermediate network elements like relays, routers, and controllers.

Figure 2:
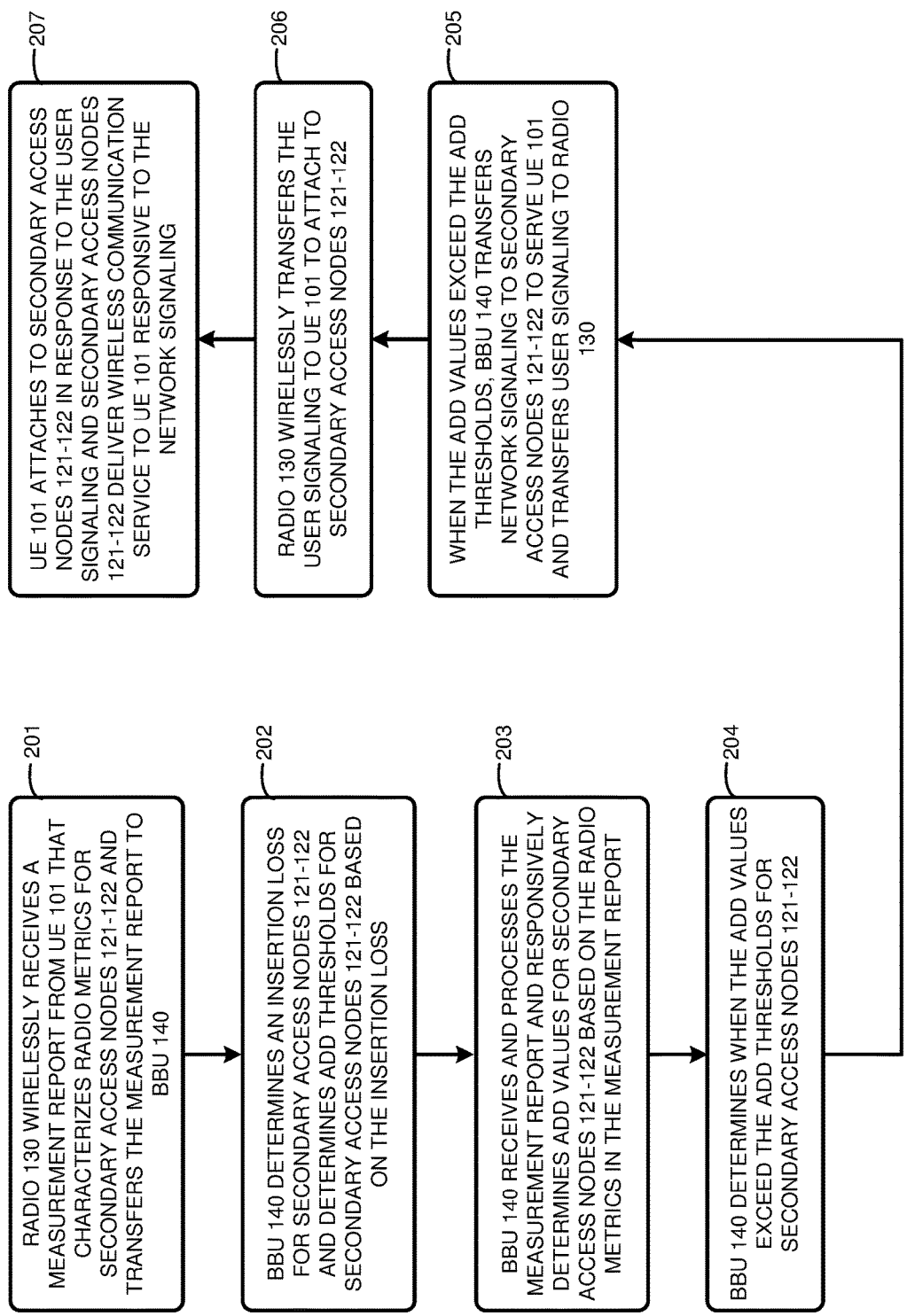
FIG. 2 illustrates an exemplary operation of the wireless communication network to serve the wireless UE over multiple wireless links based on insertion loss.

FIG. 2 illustrates an exemplary operation of wireless communication network 100 to serve wireless UE 101 with a wireless communication service over multiple wireless links based on insertion loss. In other examples, the operation of wireless communication network 100 may differ. Radio 130 wirelessly receives a measurement report from UE 101 that characterizes radio metrics for secondary access nodes 121-122 and transfers the measurement report to BBU 140 (201). BBU 140 determines an insertion loss for secondary access nodes 121-122 and determines add thresholds for secondary access nodes 121-122 based on the insertion loss (202). For example, BBU 140 may raise LTE/5GNR B1 thresholds for access nodes 121-122 as insertion losses increase to inhibit UE 101 from attaching to access nodes with high insertion loss and drive UE 101 to attach to access nodes with low insertion loss. BBU 140 receives and processes the measurement report and responsively determines add values for secondary access nodes 121-122 based on the radio metrics in the measurement report (203).

BBU 140 determines when the add values exceed the add thresholds for secondary access nodes 121-122 (204). When the add values exceed the add thresholds, BBU 140 transfers network signaling to secondary access nodes 121-122 to serve UE 101 and transfers user signaling to radio 130 (205). Radio 130 wirelessly transfers the user signaling to UE 101 to attach to secondary access nodes 121-122 (206). UE 101 attaches to secondary access nodes 121-122 in response to the user signaling and secondary access nodes 121-122 deliver wireless communication service to UE 101 responsive to the network signaling (207).

Figure 3:
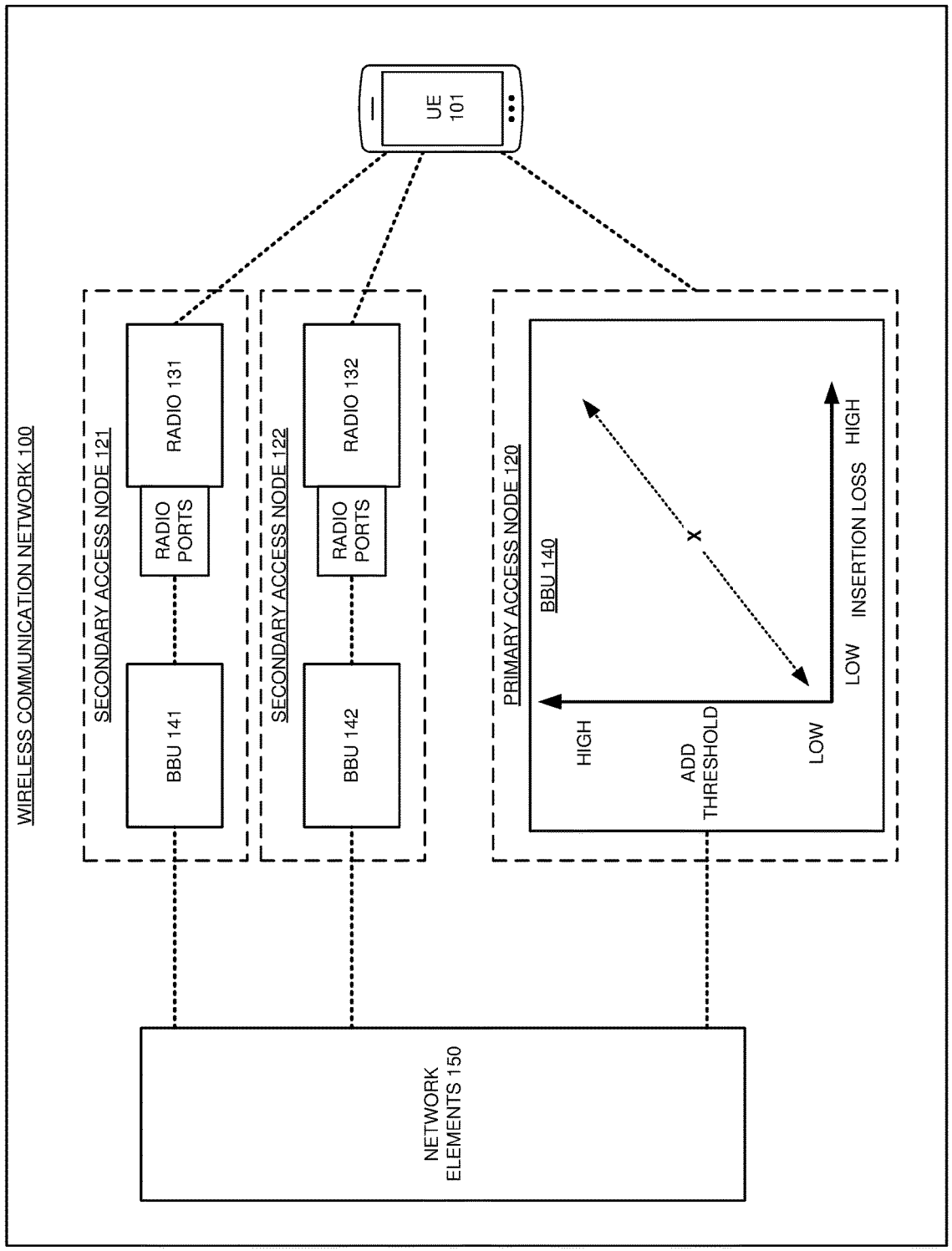
FIG. 3 illustrates the wireless communication network to implement a data structure to serve the wireless UE over multiple wireless links based on insertion loss.

FIG. 3 illustrates wireless communication network 100 to serve UE 101 over multiple wireless links based on insertion loss. The operation and structure of wireless network 100 may vary in other examples. UE 101 is wirelessly coupled to access nodes 120-122. Access nodes 120-122 are coupled to network elements 150 over backhaul links. As shown in FIG. 3, BBU 141 is coupled to radio 131 through radio ports and BBU 142 is coupled to radio 132 through radio ports.

Primary access node 120 comprises BBU 140. In this example, BBU 140 hosts a data structure that implements the graph shown on FIG. 3. However, in other examples BBU 140 may implement a different data structure or may implement another method to determine addition thresholds for the secondary access nodes. The vertical axis of the graph indicates an add threshold in an exemplary range: Low to High. The horizontal axis of the graph indicates insertion loss in an exemplary range: Low to High. These terms are illustrative and numerical values could be used. Typically, a "low" add threshold is around −130 dBm and a "low" insertion loss is around 0.5 dB while a "high" add threshold is around −100 dBm and a "high" insertion loss is around 1.5 dB. As indicated by the X mark on the graph, an insertion loss correlates to an add threshold. BBU 140 determines add thresholds for secondary access nodes 121-122 based on the insertion loss for secondary access nodes 121-122 and the data structure. Typically, BBU 140 selects high add thresholds for access nodes when their insertion loss is high and low add thresholds for access nodes when their insertion loss is low.

In operation, UE 101 attaches to primary access node 120. Primary access node 120 directs UE 101 to measure signal metrics for secondary access nodes 121-122. UE 101 wirelessly transfers a measurement report that characterizes the signal metrics for secondary access nodes 121-122 to primary access node 120. The signal metrics indicate signal strength and/or signal quality for secondary access nodes 121-122. For example, the signal metrics may comprise Received Signal Received Power (RSRPs) at UE 101's location for secondary access nodes 121-122. BBU 140 receives the measurement report and determines insertion loss for secondary access nodes 121-122. Typically, BBU 140 determines the difference between the signal power received by UE 101 and an expected received signal power based on the amount of power supplied to radios 131-132. For example, BBU 140 may determine the amount of power supplied to radios 131-132 to determine the expected received signal power at UE 101's location. BBU 140 may then compare the expected received signal power to the received signal power reported by UE 101 to determine insertion loss for secondary access nodes 121-122.

BBU 140 determines add thresholds for secondary access nodes 121-122 based on the insertion loss and the data structure. BBU 140 converts the signal metrics for secondary access nodes 121-122 into add values for secondary access nodes 121-122. BBU 140 determines when the add values exceed their corresponding add thresholds. When the add values exceed the add thresholds, BBU 140 selects ones of secondary access nodes 121-122 to add. BBU 140 transfers network signaling to the selected ones of secondary access nodes 121-122 to serve UE 101 and transfers user signaling to UE 101 to attach to the selected ones of secondary access nodes 121-122. The selected ones of secondary access nodes 121-122 exchange user data for the wireless communication service with UE 101.

In some examples, BBU 140 also determines front radio lobe power and back radio lobe power for secondary access nodes 121-122. A radio lobe comprises a radio frequency radiation pattern emitted by access nodes 120-122. BBU 140 determines a ratio of front radio lobe power to back radio lobe power. BBU 140 may determine add thresholds for secondary access nodes 121-122 based on the ratio of front lobe power to back lobe power. Typically, BBU 140 selects high add thresholds when the radio lobe ratio is small (e.g. the secondary access node is quiet) and selects low add thresholds when the radio lobe ratio is large (e.g. the secondary access node is noisy). In some examples, BBU 140 also determines radio port isolation for secondary access nodes 121-122. Radio port isolation comprises the amount of interference between the radio ports of an access node. BBU 140 may determine add thresholds for secondary access nodes 121-122 based on the radio port isolation for the radio ports of radios 131 and 132. Typically, BBU 140 selects high add thresholds when the radio port isolation is low (e.g. high interference between radio ports) and selects low add thresholds when the radio port isolation is high (e.g. low interference between radio ports).

Figure 4:
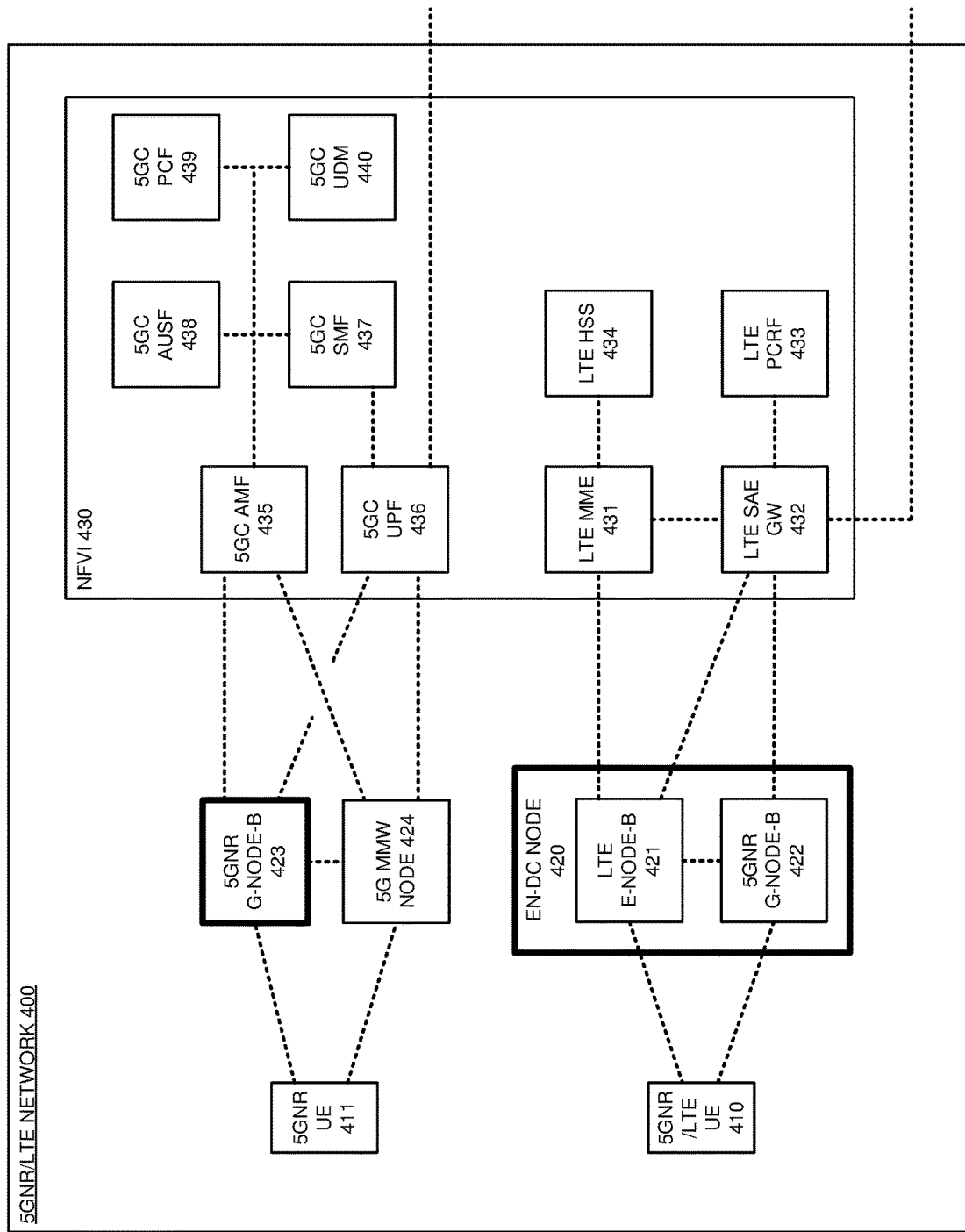
FIG. 4 illustrates a Fifth Generation New Radio (5GNR) Long Term Evolution (LTE) network to serve UEs over multiple wireless links based on insertion loss.

FIG. 4 illustrates Fifth Generation New Radio (5GNR) Long Term Evolution (LTE) network 400 to serve UEs 410-411 based on insertion loss. 5GNR/LTE network 400 is an example of wireless communication network 100, although network 100 may differ. 5GNR/LTE network 400 comprises 5GNR/LTE UE 410, 5GNR UE 411, EN-DC node 420, 5GNR gNodeB 423, 5G MMW node 424, and Network Function Virtualization Infrastructure (NFVI) 430. EN-DC node 420 comprises LTE eNodeB 421 and 5GNR gNodeB 422. NFVI 430 comprises LTE Mobility Management Entity (MME) 431, LTE System Architecture Evolution Gateway (SAE GW) 432 LTE, LTE Policy Charging Rules Function (PCRF) 433, LTE Home Subscriber System (HSS) 434, Fifth Generation Core (5GC) Access and Mobility Management Function (AMF) 435, 5GC User Plane Function (UPF) 436, 5GC Session Management Function (SMF) 437, 5GC Authentication and Security Function (AUSF) 438, Policy Control Function (PCF 439), and 5GC Unified Data Manager (UDM) 440. In some examples, SAE GW 432 may be divided into a Serving Gateway (SGW) and a Packet Data Network Gateway (PGW).

In operation, UE 410 attaches to LTE eNodeB 421 in EN-DC node 420 and UE 410 indicates its 5G capabilities and location. LTE eNodeB 421 requests data service for UE 410 from LTE MME 431 over S1-MME signaling and indicates the 5G capabilities of UE 410. LTE MME 431 interacts with HSS 434 to authenticate and authorize LTE/5GNR UE 410 for wireless data services that are represented by Access Point Names (APNs). LTE MME 431 generates a B1 measurement object for 5GNR/LTE UE 410 in response to the 5G UE capabilities and the UE authorization. The B1 measurement object may specify frequency bands for UE 410 to measure and/or other parameters for UE 410 to measure when establishing duel connectivity. LTE MME 431 transfers the APNs for UE 410 to SAE GW 432. SAE GW 432 interacts with LTE PCRF 433 to select Quality-of-Service Class Identifiers (QCIs) and network addresses for UE 410 based on the APNs. SAE GW 432 transfers the APNs, QCIs, and network addresses for UE 410 to LTE MME 431. MME 431 transfers the APNs, QCIs, network address, and the B1 measurement object for UE 410 to LTE eNodeB 421. LTE SAE GW 432 exchanges user data for UE 410 with external systems. SAE GW 432 exchanges the user data with LTE eNodeB 421. LTE eNodeB 421 transfers the APNs, QCIs, network address, and the B1 measurement object to UE 410. LTE eNodeB 421 exchanges the user data with UE 410.

In response to the B1 measurement object, UE 410 measures the signal strength of the reference signal from 5GNR gNodeB 422. UE 410 generates a measurement report that characterizes the signal strength and transfers the measurement report to LTE eNodeB 421. LTE eNodeB 421 determines insertion loss for 5GNR gNodeB 422. For example, LTE eNodeB 421 may request wireless output power from 5GNR gNodeB 422 and compare the output power from 5GNR gNodeB 422 to the reported signal strength from UE 410 to determine insertion loss for 5GNR gNodeB 422. Alternatively, LTE eNodeB 421 may request insertion loss for 5GNR gNodeB 422 from MME 431 or may implement some other method to determine insertion loss for 5GNR gNodeB 422. LTE eNodeB 421 determines a B1 addition threshold for 5GNR gNodeB 422 based on the insertion loss for 5GNR gNodeB 422.

LTE eNodeB 421 determines a frequency offset and hysteresis for 5GNR gNodeB 422. LTE eNodeB 421 determines an inter Radio Access Technology (RAT) addition value for 5GNR gNodeB 422 based on the measurement report received from UE 410. Typically, the inter-RAT addition value comprises a sum of the signal strength, the frequency offset, and the hysteresis. LTE eNodeB 421 determines when the inter-RAT addition value for 5GNR gNodeB 422 is greater than the B1 addition threshold for 5GNR gNodeB 422. When the inter-RAT addition value is greater than the B1 addition threshold for 5GNR gNodeB 422, LTE eNodeB 421 directs 5GNR gNodeB 422 to serve UE 410 and directs UE 410 to attach to 5GNR gNodeB 422. LTE eNodeB 421 notifies LTE MME 431 and LTE MME 431 directs SAE GW 432 to serve UE 410 over 5GNR gNodeB 422. In response, LTE SAE GW 432 exchanges user data for UE 410 with 5GNR gNodeB 422. 5GNR gNodeB 422 exchanges the user data with UE 410.

In some examples, LTE eNodeB 421 determines a B1 addition threshold for 5GNR gNodeB 422 based on a radio lobe power ratio for 5GNR gNodeB 422. A radio lobe power ratio comprises a ratio of main radio lobe power to back radio lobe power for 5GNR gNodeB 422. LTE eNodeB 421 may measure front radio lobe power and back radio lobe power for 5GNR gNodeB 422 to determine the radio lobe ratio. Alternatively, LTE eNodeB 421 may request front lobe power and back lobe power from 5GNR gNodeB 422 or may implement some other method to determine the radio lobe power ratio for 5GNR gNodeB 422. LTE eNodeB 421 determines a B1 threshold for 5GNR gNodeB 422 based on the radio lobe power ratio and compares the inter-RAT addition value to the B1 addition threshold to determine to add 5GNR gNodeB 422. Typically, LTE eNodeB 421 selects high add thresholds when the radio lobe ratio is small and selects low add thresholds when the radio lobe ratio is large. LTE eNodeB 421 may determine the B1 threshold based on both the insertion loss and the radio lobe power ratio for 5GNR gNodeB 422.

In some examples, LTE eNodeB 421 determines a B1 addition threshold for 5GNR gNodeB 422 based on radio port isolation loss for 5GNR gNodeB 422. Radio port isolation loss comprises the amount of interference between the radio ports of 5GNR gNodeB 422. For example, LTE eNodeB 421 may request a radio port isolation rating from 5GNR gNodeB 422 to determine radio port isolation loss or may implement some other technique to determine port isolation loss. LTE eNodeB 421 determines a B1 addition threshold for 5GNR gNodeB 422 based on the radio port isolation loss and compares the inter-RAT addition value to the B1 addition threshold to determine to add 5GNR gNodeB 422. Typically, LTE eNodeB 421 selects high add thresholds when the port isolation loss is high and selects low add thresholds when the port isolation loss is low. LTE eNodeB 421 may determine the B1 threshold based on both the insertion loss and the radio port isolation loss for 5GNR gNodeB 422.

In some examples, LTE eNodeB 421 determines B1 addition thresholds for 5GNR gNodeB 422 based on the antenna gain of 5GNR gNodeB 422. Antenna gain comprises the efficiency and directivity of 5GNR gNodeB 422. For example, LTE eNodeB 421 may request antenna gain from 5GNR gNodeB 422 to determine antenna gain or may implement some other method to determine antenna gain for 5GNR gNodeB 422. LTE eNodeB 421 determines a B1 addition threshold for 5GNR gNodeB 422 based on the antenna gain and compares the inter-RAT addition value to the B1 addition threshold to determine to add 5GNR gNodeB 422. Typically, LTE eNodeB 421 selects high add thresholds when the antenna gain is low and selects low add thresholds when the antenna gain is high. LTE eNodeB 421 may determine the B1 threshold based on both the insertion loss and the antenna gain for 5GNR gNodeB 422. In some examples, LTE eNodeB 421 determines B1 addition thresholds for 5GNR gNodeB 422 based on other combinations of the insertion loss and the radio lobe power ratio, the radio port isolation loss, and/or the antenna gain for 5GNR gNodeB 422.

In some examples, LTE eNodeB 421 determines a B1 drop threshold for 5GNR gNodeB 422 based on the insertion loss for 5GNR gNodeB 422. The B1 drop threshold may comprise a different threshold value than the B1 addition threshold. LTE eNodeB 421 receives a subsequent 5GNR signal strength measurement for 5GNR gNodeB 422 from UE 410. LTE eNodeB 421 determines an inter-RAT drop value for 5GNR gNodeB 422 based on the sum of the subsequent signal strength, the frequency offset, and the hysteresis. When the inter-RAT drop value for 5GNR gNodeB 422 is lower than the B1 drop threshold for 5GNR gNodeB 422, LTE eNodeB 421 signals 5GNR gNodeB 422 to stop serving UE 410 and signals UE 410 to detach from 5GNR gNodeB 422. LTE MME 431 directs LTE SAE GW 432 to stop serving UE 410 over 5GNR gNodeB 422. In response, LTE SAE GW 432 stops exchanging the user data for UE 410 with 5GNR gNodeB 422. 5GNR gNodeB 422 stops exchanging the user data with UE 410.

In some examples, LTE eNodeB 421 performs dynamic bandwidth sharing with 5GNR gNodeB 422. Dynamic bandwidth sharing comprises transferring resource blocks between different frequency channels. For example, LTE eNodeB 421 may transfer resource blocks from a frequency channel used by LTE eNodeB 421 to a frequency channel used by 5GNR gNodeB 422 to increase the frequency channel size for 5GNR gNodeB 422. Typically, LTE eNodeB 421 will perform dynamic bandwidth sharing when either LTE eNodeB 421 or 5GNR gNodeB 422 becomes overloaded.

Note that 5GNR gNodeB 423 and 5G MMW node 424 use different types of 5G Radio Access Technology (RAT). The different types of 5G RAT may have different frequency channel sizes, frequency levels, resource block time intervals, and resource block bandwidths. For example, 5GNR gNodeB 423 may provide an enhanced voice calling service with unique time intervals and bandwidths while MMW node 424 may provide an enhanced video broadcast service with unique time intervals and bandwidths while. Some 5GNR UEs are not capable of using each type of 5G RAT from 5GNR gNodeB 423 and 5G MMW node 424, but 5GNR UE 411 is capable of using each type of 5G RAT.

In operation, 5GNR UE 411 attaches to 5GNR gNodeB 423 and indicates its 5G capabilities for multiple types of 5G RAT and its location. 5GNR gNodeB 423 requests data service from 5GC AMF 435 and indicates the 5G capabilities for UE 411 to 5GC AMF 425 over N2 signaling. 5GC AMF 435 interacts with 5GC SMF 437, 5GC AUSF 438, 5GC UDM 440, and 5GC PCF 439 to authenticate and authorize 5GNR UE 411 for 5G data services. 5GC AMF 435 generates a 5GNR measurement object in response to the 5G UE capabilities and the 5G authorization. The 5GNR measurement object may specify frequency bands for UE 411 to measure when establishing duel connectivity or other parameters for UE 411 to establish duel connectivity. 5GC AMF 435 transfers quality-of-service metrics, network addressing, and the 5GNR measurement object for UE 411 to 5GNR gNodeB 423 and 5GC SMF 437. 5GC SMF 437 directs 5GC UPF 436 to serve UE 411 per the quality-of-service metrics and network addressing over 5GNR gNodeB 423. 5GNR gNodeB 423 transfers the selected APNs, QCIs, network addresses, and 5GNR measurement object to UE 411. 5GNR gNodeB 423 exchanges user data with UE 411.

In response to the 5GNR measurement object, UE 411 measures the signal strength of the reference signal from 5G MMW node 424. UE 411 generates a measurement report that characterizes the signal strength for 5G MMW node 424 and transfers the measurement report to 5GNR gNodeB 423. 5GNR gNodeB 423 determines insertion loss for 5G MMW node 424. For example, 5GNR gNodeB 423 may request output power from 5G MMW node 424 and determine an expected signal strength for the location of UE 411. 5GNR gNodeB 423 may then compare the expected signal strength to the reported signal strength to determine insertion loss for 5G MMW node 424. 5GNR gNodeB 423 determines an inter-RAT addition threshold for 5G MMW node 424 based on the insertion loss for 5G MMW node 424. In some examples, 5GNR gNodeB 423 implements a data structure that correlates insertion loss to inter-RAT addition thresholds to select inter-RAT thresholds for 5G MMW node 424. Typically, 5GNR gNodeB 423 selects a high inter-RAT addition threshold when the insertion loss is high. Conversely, 5GNR gNodeB 423 selects a low inter-RAT addition threshold when the insertion loss is low.

5GNR gNodeB 423 determines a frequency offset and hysteresis for 5G MMW node 424. 5GNR gNodeB 423 determines an inter-RAT addition value for 5G MMW node 424 based on the measurement report received from UE 410. Typically, the inter-RAT addition value comprises a sum of the signal strength, the frequency offset, and the hysteresis for MMW node 424. 5GNR gNodeB 423 determines when the inter-RAT addition value for 5G MMW node 424 is greater than the inter-RAT addition threshold for 5G MMW node 424. When the inter-RAT addition value is greater than the inter-RAT addition threshold, 5GNR gNodeB 423 directs 5G MMW node 424 to serve UE 411 and directs UE 411 to attach to 5G MMW node 424. 5GNR gNodeB 423 notifies 5GC AMF 435 of the attachment. 5GC AMF 435 directs 5GC SMF 437 to direct 5GC UPF 436 to serve UE 411 per the quality-of-service metrics and network addressing over 5G MMW node 424. 5GNR UE 411 attaches to 5G MMW node 424 and 5G MMW node 424 exchanges user data with UE 411.

In some examples, 5GNR gNodeB 423 determines 5GNR inter-RAT addition thresholds for 5G MMW node 424 based on a radio lobe power ratio for 5G MMW node 424. A radio lobe ratio comprises a ratio of main radio lobe power to back radio lobe power for 5G MMW node 424. 5GNR gNodeB 423 may measure front radio lobe power and back radio lobe power for 5G MMW node 424 to determine the radio lobe ratio. Alternatively, 5GNR gNodeB 423 may request front lobe power and back lobe power from 5G MMW node 424, store radio lobe power ratios in memory, or may implement some other method to determine the radio lobe power ratio for 5G MMW node 424. 5GNR gNodeB 423 determines a 5GNR inter-RAT threshold for 5G MMW node 424 based on the radio lobe power ratio and compares the inter-RAT addition value to the 5GNR inter-RAT addition threshold to determine to add 5G MMW node 424. Typically, 5GNR gNodeB 423 selects high add thresholds when the radio lobe ratio is small and selects low add thresholds when the radio lobe ratio is large. LTE eNodeB 421 may determine the 5GNR inter-RAT threshold based on both the insertion loss and the radio lobe power ratio for 5G MMW node 424.

In some examples, 5GNR gNodeB 423 determines a 5GNR inter-RAT addition threshold for 5G MMW node 424 based on radio port isolation loss for 5G MMW node 424. Radio port isolation comprises the amount of interference between the radio ports of 5G MMW node 424. For example, 5GNR gNodeB 423 may request a radio port isolation rating from 5G MMW node 424 to determine radio port isolation loss or may implement some other technique to determine port isolation loss. 5GNR gNodeB 423 determines a 5GNR inter-RAT addition threshold for 5G MMW node 424 based on the radio port isolation loss and compares the inter-RAT addition value to the 5GNR inter-RAT addition threshold to determine to add 5G MMW node 424. Typically, 5GNR gNodeB 423 selects high add thresholds when the port isolation loss is high and selects low add thresholds when the port isolation loss is low. 5GNR gNodeB 423 may determine the 5GNR inter-RAT threshold based on both the insertion loss and the radio port isolation loss for 5G MMW node 424.

In some examples, 5GNR gNodeB 423 determines 5GNR inter-RAT addition thresholds for 5G MMW node 424 based on antenna gain of 5G MMW node 424. Antenna gain comprises the efficiency and directivity of 5G MMW node 424. For example, 5GNR gNodeB 423 may request antenna gain from 5G MMW node 424 to determine antenna gain or may implement some other method to determine antenna gain for 5G MMW node 424. 5GNR gNodeB 423 determines a 5GNR inter-RAT addition threshold for 5G MMW node 424 based on the antenna gain and compares the inter-RAT addition value to the 5GNR inter-RAT addition threshold to determine to add 5G MMW node 424. Typically, 5GNR gNodeB 423 selects high add thresholds when the antenna gain is low and selects low add thresholds when the antenna gain is high. 5GNR gNodeB 423 may determine the 5GNR inter-RAT threshold based on both the insertion loss and the antenna gain for 5G MMW node 424. In some examples, 5GNR gNodeB 423 determines 5GNR inter-RAT addition thresholds for 5G MMW node 424 based on other combinations of the insertion loss and the radio lobe power ratio, the radio port isolation loss, and/or the antenna gain for 5G MMW node 424.

In some example, 5GNR gNodeB 423 also determines an inter-RAT drop threshold for 5G MMW node 424 based on the insertion loss. 5GNR gNodeB 423 receives subsequent signal strength measurements for 5G MMW node 424 from UE 411. 5GNR gNodeB 423 determines an inter-RAT drop value for 5G MMW node 424 based on the subsequent signal strength for 5G MMW node 424, the frequency offset, and the hysteresis. When the inter-RAT drop value for MMW node 424 is lower than the inter-RAT drop threshold for MMW node 424, 5GNR gNodeB 423 signals UE 411 to detach from 5G MMW node 424 and 5G MMW node 424 stops exchanging the user data with UE 411.

In some examples, 5GNR gNodeB 423 performs dynamic bandwidth sharing with 5G MMW node 424. Dynamic bandwidth sharing comprises transferring resource blocks between different frequency channels. For example, 5GNR gNodeB 423 may transfer resource blocks from a frequency channel used by 5GNR gNodeB 423 to a frequency channel used by 5G MMW node 424 to increase the frequency channel size for 5G MMW node 424. Typically, 5GNR gNodeB 423 will perform dynamic bandwidth sharing when either 5GNR gNodeB 423 or 5G MMW node 424 becomes overloaded.

In some examples, UEs 410-411 determine insertion loss for 5GNR gNodeB 422 and MMW node 424 as described above for LTE eNodeB 421 and 5GNR gNodeB 423. UEs 410-411 may request output power from 5GNR gNodeB 422 and 5G MMW node 424 and compare the output power to the measured signal power to determine insertion loss. UEs 410-411 may report the determined insertion loss to EN-DC node 420 and to 5GNR gNodeB 423 to trigger threshold events based on the reported insertion loss.

Advantageously, LTE eNodeB 421 effectively and efficiently selects B1 thresholds based on insertion loss to serve UEs over multiple wireless links. Likewise, 5GNR gNodeB 423 effectively and efficiently selects inter-RAT thresholds based on insertion loss to serve UEs over multiple wireless links.

Figure 5:
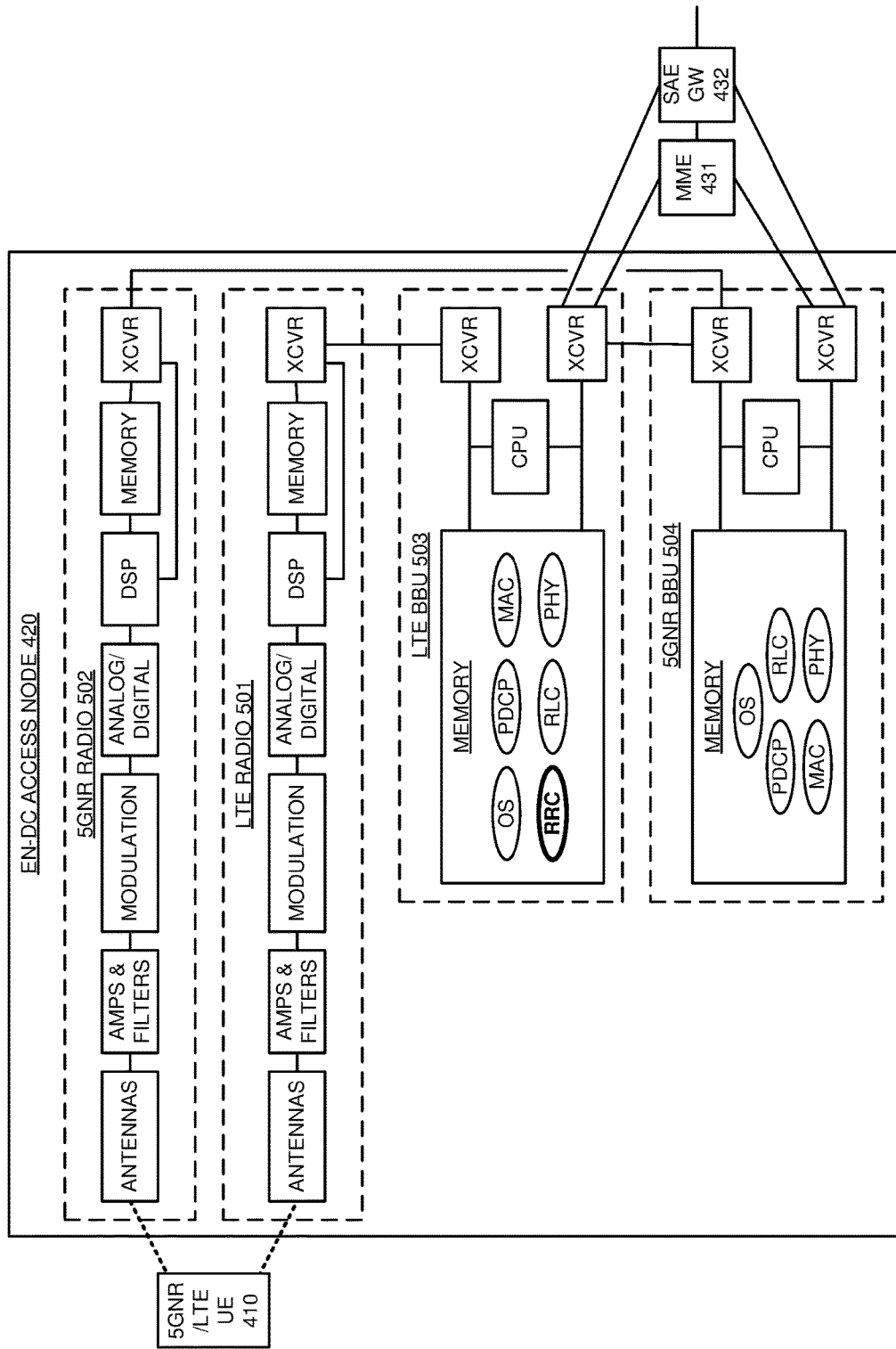
FIG. 5 illustrates an Evolved Universal Terrestrial Radio Access Network Dual Connectivity (EN-DC) access node to serve a 5GNR/LTE UE over multiple wireless links based on insertion loss.

FIG. 5 illustrates EN-DC access node 420 to provide wireless communications service to UE 410 over multiple wireless links based on insertion loss. EN-DC access node 420 is an example of primary access node 120, although primary access node 120 may differ. As shown in FIG. 4, EN-DC access node 420 includes LTE eNodeB 421 and 5GNR gNodeB 422, however individual structures for LTE eNodeB 421 and 5GNR gNodeB 422 are omitted for clarity. EN-DC access node 420 comprises LTE radio 501, 5GNR radio 502, LTE Baseband Unit (BBU) 503, and 5GNR BBU 504. Radios 501-502 comprise antennas, amplifiers, filters, modulation, analog-to-digital interfaces, DSP, memory, and transceivers (XCVR) that are coupled over bus circuitry. BBUs 503-504 comprise memory, CPU, and transceivers that are coupled over bus circuitry. The memories in BBUs 503-504 store operating systems (OS) and network applications like Physical Layer (PHY), Media Access Control (MAC), Radio Link Control (RLC), Packet Data Convergence Protocol (PDCP), and Radio Resource Control (RRC). The CPUs in BBUs 503-504 execute the operating systems, PHYs, MACs, RLCs, PDCPs, and RRCs to exchange network signaling between UE 410 and MME 431 and to exchange user data between UE 410 and SAE GW 432.

RRC functions comprise authentication, security, handover control, status reporting, Quality-of-Service (QoS), network broadcasts and pages, and network selection. PDCP functions comprise LTE/5GNR allocations, security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

UE 410 is wirelessly coupled to the antennas in LTE radio 501 over an LTE link. The transceiver in LTE radio 501 is coupled to a transceiver in LTE BBU 503 over Common Public Radio Interface (CPRI) links. A transceiver in LTE BBU 503 is coupled to MME 431 and SAE GW 432 over backhaul links. UE 410 is wirelessly coupled to the antennas in 5GNR radio 502 over an 5GNR link. The transceiver in 5GNR radio 502 is coupled to a transceiver in 5GNR BBU 504 over CPRI links. A transceiver in 5GNR BBU 504 is coupled to MME 431 and to SAE GW 432 over backhaul links. A transceiver in LTE BBU 503 is coupled to a transceiver in 5GNR BBU 504 over X2 links.

In operation, UE 410 wirelessly attaches to LTE antennas in LTE radio 501. The LTE antennas in LTE radio 501 receive wireless LTE signals from UE 410 that transport Uplink (UL) LTE signaling, UL LTE data. The UL signaling indicates 5GNR capabilities for UE 410 and the location of UE 410. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL LTE symbols from the UL digital signals. The CPUs execute the network applications to process the UL LTE symbols and recover the UL LTE signaling and the UL LTE data. The RRC processes the UL LTE signaling and Downlink (DL) S1-MME signaling to generate new UL S1-MME signaling and new DL LTE signaling. The RRC transfers the new UL S1-MME signaling, including the 5GNR capabilities of UE 410, to MME 431 over the backhaul links. MME 431 authenticates and authorizes 5GNR service for UE 410. In response to the authentication and authorization, MME 431 generates a B1 measurement object specifying frequency bands for UE 410 to measure. In LTE BBU 503, the LTE RRC receives the DL S1-MME signaling including the B1 measurement object from MME 431. The LTE PDCP transfers the UL LTE data to LTE SAE GW 432 over the backhaul links. The LTE PDCP receives DL LTE data from SAE GW 432.

The LTE network applications process the new DL LTE signaling and the DL LTE data to generate corresponding DL LTE symbols that carry the DL LTE signaling, DL LTE data, and the B1 measurement object. In LTE radio 501, the DSP processes the DL LTE symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless LTE signals that transport the DL LTE signaling, DL LTE data, and B1 measurement object to UE 410.

In response to the B1 measurement object, UE 410 measures signal strength of the reference signal for 5GNR BBU 504. UE 410 wirelessly transfers a measurement report that characterizes the 5GNR signal strength for BBU 504 to LTE radio 501. LTE radio 501 transfers the measurement report to LTE BBU 503 over the CPRI links. The LTE RRC in LTE BBU 503 determines insertion loss for 5GNR radio 502. For example, the LTE RRC may request output power from 5GNR BBU 504 and determine an expected received signal power for UE 410. The LTE RRC may then compare the expected received signal power to the reported received signal power from UE 410 to determine insertion loss for 5GNR radio 502. The LTE RRC in LTE BBU 503 determines a B1 add threshold for 5GNR BBU 504 based on the insertion loss. The LTE RRC may implement a data structure that correlates insertion loss to B1 addition thresholds to determine the B1 add threshold for 5GNR BBU 504. Typically, the LTE RRC selects high B1 thresholds when the insertion loss is high and selects low B1 thresholds when the insertion loss is low.

In some examples, the LTE RRC in LTE BBU 503 also determines the B1 addition threshold for 5GNR BBU 504 based on a radio lobe power ratio for 5GNR radio 502. The LTE RRC may store lobe power ratios for 5GNR radio 502 or implement some other method to determine the lobe power ratio. Typically, the LTE RRC selects high add thresholds when the radio lobe ratio is small and selects low add thresholds when the radio lobe ratio is large. In some examples, the LTE RRC also determines the B1 addition threshold for 5GNR BBU 504 based on radio port isolation loss for 5GNR radio 502. For example, the LTE RRC may request a radio port isolation rating from 5GNR BBU 504 to determine radio port isolation loss or may implement some other technique to determine port isolation loss. Typically, the LTE RRC selects high add thresholds when the port isolation loss is high and selects low add thresholds when the port isolation loss is low. The LTE RRC in BBU 503 may select the B1 threshold based on combinations of the insertion loss, radio lobe power ratio, and radio port isolation.

The LTE RRC in LTE BBU 503 determines frequency offset and hysteresis for 5GNR BBU 504. The LTE RRC in BBU 503 determines an inter-RAT add value for 5GNR BBU 504 based on the sum of the signal strength, the frequency offset, and the hysteresis for 5GNR BBU 504. In some examples, the LTE RRC in BBU 503 implements a data structure to convert reported signal strength into an add value for 5GNR BBU 504. The LTE RRC in BBU 503 determines when the inter-RAT add value is greater than the B1 add threshold. When the inter-RAT add value for 5GNR BBU 504 exceeds the B1 add threshold for 5GNR BBU 504, the LTE RRC in BBU 503 directs the 5GNR PDCP in 5GNR BBU 504 to serve UE 410. The LTE RRC in BBU 503 also directs UE 410 to attach to the 5GNR PDCP in 5GNR BBU 504 over LTE radio 501. UE 410 attaches to the 5GNR PDCP in BBU 504 over 5GNR radio 502. The LTE RRC in BBU 503 notifies MME 431 of the 5GNR attachment. MME 431 directs SAE GW 432 to serve UE 410 over 5GNR BBU 504. SAE GW 432 exchanges 5GNR data with the 5GNR PDCP in 5GNR BBU 504. The 5GNR PDCP in BBU 504 exchanges the 5GNR data with the 5GNR PDCP in UE 410 over the RLCs, MACs, and PHYs.

In 5GNR radio 502, the antennas receive wireless 5GNR signals from UE 410 that transport Uplink (UL) 5GNR signaling and UL 5GNR data. The antennas in 5GNR radio 502 transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSPs. The DSPs recover UL 5GNR symbols from the UL digital signals. The CPUs execute the network applications to process the UL 5GNR symbols and recover the UL 5GNR signaling and the UL 5GNR data. The 5GNR PDCP processes the UL 5GNR signaling and DL X2 signaling from the LTE RRC in LTE BBU 503 to generate new UL X2 signaling and new DL 5GNR signaling. The 5GNR PDCP transfers the new UL X2 signaling to the LTE RRC in BBU 503. The 5GNR PDCP transfers the UL 5GNR data to SAE GW 432 over backhaul links.

In 5GNR BBU 504, the 5GNR PDCP receives the DL X2 signaling from the LTE RRC in BBU 503. The 5GNR PDCP also receives DL 5GNR data from SAE GW 432. The 5GNR network applications process the new DL 5GNR signaling and the DL 5GNR data to generate corresponding DL 5GNR symbols that carry the DL 5GNR signaling and DL 5GNR data. In 5GNR radio 502, the DSPs process the DL symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas in 5GNR radio 502 to emit corresponding wireless 5GNR signals that transport the DL 5GNR signaling and DL 5GNR data to UE 410.

In some examples, the LTE RRC in LTE BBU 503 also determines a B1 drop threshold for 5GNR BBU 504 based on the insertion loss. The LTE RRC in BBU 503 wirelessly receives a subsequent measurement report that characterizes 5GNR signal strength for 5GNR BBU 504 from UE 410. The LTE RRC in LTE BBU 503 determines an inter-RAT drop value for 5GNR BBU 504 based on the subsequent signal strengths, the frequency offsets, and the hysteresis. The LTE RRC in LTE BBU 503 stops the service to UE 410 over 5GNR radio 502 when the inter-RAT drop value for 5GNR BBU 504 is less than the B1 drop threshold for 5GNR BBU 504. When the inter-RAT drop value for 5GNR BBU 504 is less than the B1 drop threshold, the LTE RRC in LTE BBU 503 directs the 5GNR PDCP in BBU 504 to stop serving UE 410 and notifies MME 431. The LTE RRC in LTE BBU 503 directs UE 410 to detach from 5GNR PDCP in 5GNR BBU 504. UE 410 wirelessly detaches from 5GNR BBU 504. MME 431 directs SAE GW 432 to stop serving UE 410 over 5GNR BBU 504. SAE GW 432 stops exchanging 5GNR data with the 5GNR PDCP in 5GNR BBU 504. The 5GNR PDCP in BBU 504 stops exchanging the 5GNR data with the 5GNR PDCP in UE 410 over the RLCs, MACs, and PHYs.

Figure 6:
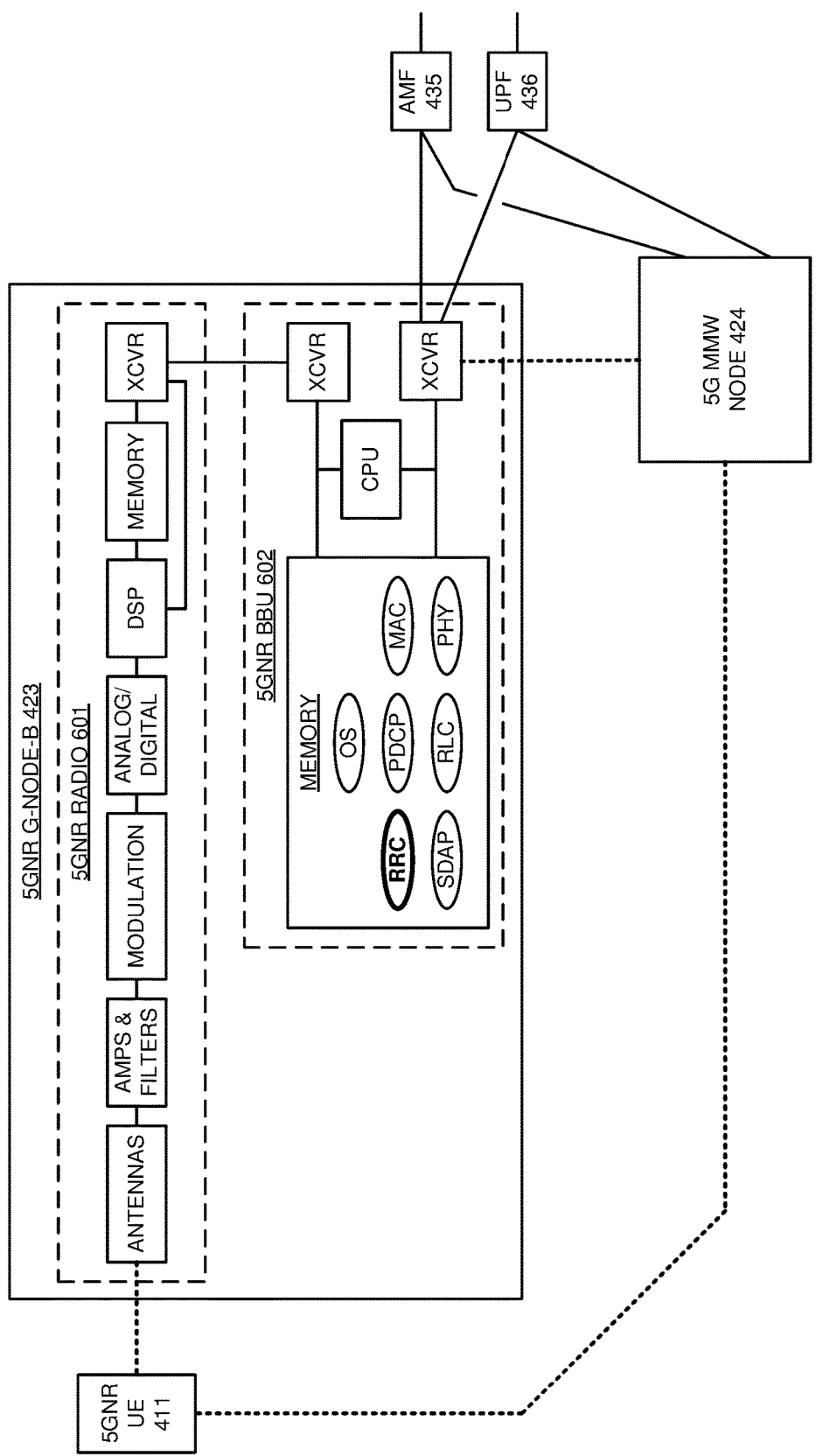
FIG. 6 illustrates a 5GNR gNodeB to serve 5GNR UE over multiple wireless links based on insertion loss.

FIG. 6 illustrates 5GNR gNodeB 423 to serve 5GNR UE 411 over multiple wireless links based on insertion loss. 5GNR gNodeB 423 is an example of primary access node 120, although access node 120 may differ. 5GNR gNodeB 423 comprises 5GNR radio 601 and 5GNR BBU 602. 5GNR radio 601 comprises antennas, amplifiers, filters, modulation, analog-to-digital interfaces, DSP, memory, and transceivers that are coupled over bus circuitry. 5GNR UE 411 is wirelessly coupled to the antennas in 5GNR radio 601 over a 5GNR link. The transceiver in 5GNR radio 601 is coupled to a transceiver in 5GNR BBU 602 over CPRI links. A transceiver in 5GNR BBU 602 is coupled to AMF 435 and UPF 436 over backhaul links. A transceiver in 5GNR BBU 602 is coupled to 5G MMW node 424 of X2 links. 5GNR BBU 602 comprises memory, CPU, and transceivers that are coupled over bus circuitry. The memory in BBU 602 stores operating systems and network applications like PHY, MAC, RLC, PDCP, RRC, and Service Data Adaptation Protocol (SDAP). The CPU in BBU 602 executes the operating systems, PHYs, MACs, RLCs, PDCPs, SDAPs, and RRCs to exchange network signaling with 5GNR UE 411 and AMF 435 and to exchange user data between 5GNR UE 411 and UPF 436.

RRC functions comprise authentication, security, handover control, status reporting, QoS, network broadcasts and pages, and network selection. SDAP functions comprise QoS marking and flow control. PDCP functions comprise LTE/5GNR allocations, security ciphering, header compression and decompression, sequence numbering and re-sequencing, and de-duplication. RLC functions comprise ARQ, sequence numbering and resequencing, and segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, pre-coding, DFTs/IDFTs, and RE mapping/de-mapping.

In operation, 5GNR UE 411 wirelessly attaches to 5GNR radio 601. In 5GNR radio 601, the antennas receive wireless 5GNR signals from 5GNR UE 411 that transport UL 5GNR signaling and UL 5GNR data. The 5G UL signaling from UE 411 indicates 5G capabilities for UE 411 and the location of UE 411. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL 5GNR symbols from the UL digital signals. The CPUs execute the network applications to process the UL 5GNR symbols and recover the UL 5GNR signaling and the UL 5GNR data. The 5G RRC in 5GNR BBU 602 processes the UL 5GNR signaling and DL N2 signaling from AMF 435 to generate new UL N2 signaling and new DL 5GNR signaling. The 5GNR RRC transfers the new UL N2 signaling to AMF 435. The 5GNR SDAP in 5GNR BBU 602 transfers the UL 5GNR data to UPF 436 over backhaul links.

In 5GNR BBU 602, the 5GNR RRC receives the DL N2 signaling (including a 5GNR measurement object) from AMF 435. The 5GNR SDAP receives DL 5GNR data from UPF 436. The 5GNR network applications process the new DL 5GNR signaling and the DL 5GNR data to generate corresponding DL 5GNR symbols that carry the DL 5GNR signaling and DL 5GNR data. In 5GNR radio 601, the DSP processes the DL 5GNR symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals that transport the DL 5GNR signaling, DL 5GNR data, and 5GNR measurement object to 5GNR UE 411.

In response to the 5GNR measurement object, UE 411 measures signal strength of the reference signal for 5G MMW node 424. UE 411 wirelessly transfers a measurement report that characterizes the MMW signal strength for MMW node 424 to 5GNR radio 601. 5GNR radio 601 transfers the measurement report to 5GNR BBU 602 over the CPRI links. The 5GNR RRC in 5GNR BBU 602 determines insertion loss for 5G MMW node 424. For example, the 5GNR RRC may request output power from 5G MMW node 424 and determine an expected received signal power for UE 411. The 5GNR RRC may then compare the expected received signal power to the reported received signal power from UE 410 to determine insertion loss for MMW node 424. The 5GNR RRC in 5GNR BBU 602 determines a 5GNR inter-RAT add threshold for 5G MMW node 424 based on the insertion loss. The 5GNR RRC may implement a data structure that correlates insertion loss to 5GNR inter-RAT addition thresholds to determine the 5GNR inter-RAT add threshold for 5G MMW node 424. Typically, the 5GNR RRC selects high 5GNR inter-RAT add thresholds when the insertion loss is high and selects low 5GNR inter-RAT add thresholds when the insertion loss is low.

In some examples, the 5GNR RRC in 5GNR BBU 602 determines the 5GNR inter-RAT addition threshold for 5G MMW node 424 based on a radio lobe power ratio for 5G MMW node 424. The 5GNR RRC may store lobe power ratios for 5G MMW node 424 or implement some other method to determine the lobe power ratio. Typically, the 5GNR RRC selects high add thresholds when the radio lobe ratio is small and selects low add thresholds when the radio lobe ratio is large. In some examples, the 5GNR RRC determines the 5GNR inter-RAT addition threshold for 5G MMW node 424 based on radio port isolation loss for 5G MMW node 424. For example, the 5GNR RRC may request a radio port isolation rating from 5G MMW node 424 to determine radio port isolation loss or may implement some other technique to determine port isolation loss. Typically, the 5GNR RRC selects high add thresholds when the port isolation loss is high and selects low add thresholds when the port isolation loss is low. The 5GNR RRC in BBU 602 may select the 5GNR inter-RAT add threshold based on combinations of the insertion loss, radio lobe power ratios, and/or radio port isolations.

The 5GNR RRC in BBU 602 determines frequency offset and hysteresis for 5G MMW node 424. The 5GNR RRC determines an inter-RAT addition value for 5G MMW node 424 based on the signal strength for 5G MMW node 424, the frequency offset, and the hysteresis. In some examples, the 5GNR RRC implements a data structure that correlates signal strengths to inter-RAT add values to determine the inter-RAT add value for 5G MMW node 424. The 5GNR RRC in BBU 602 determines when the inter-RAT addition value is greater than the inter-RAT addition threshold for 5G MMW access node 424. When the inter-RAT addition value for 5G MMW node 424 is greater than the inter-RAT addition threshold for 5G MMW node 424, the 5GNR RRC in BBU 602 directs 5G MMW node 424 to serve UE 411 and directs UE 411 to attach to 5G MMW node 424. The 5GNR RRC in 5GNR BBU 602 notifies 5GC AMF 435 of the attachment and 5GC AMF 435 directs 5GC SMF 437 to direct 5GC UPF 436 to serve UE 411 per the quality-of-service metrics and network addressing over 5G MMW node 424. 5GNR UE 411 attaches to 5G MMW node 424. 5G MMW node 424 exchanges user data with UE 411.

In some examples, the 5GNR RRC in BBU 602 also determines an inter-RAT drop threshold for 5G MMW node 424 based on the insertion loss for 5G MMW node 424. The 5GNR RRC in BBU 602 receives a subsequent measurement report from UE 411 that characterizes the signal strength for 5G MMW node 424. The 5GNR RRC in BBU 602 determines an inter-RAT drop value for 5G MMW node 424 based on the subsequent signal strength for 5G MMW node 424, the frequency offset, and the hysteresis. When the drop value for 5G MMW node 424 is lower than the drop threshold 5G MMW node 424, the 5GNR RRC in BBU 602 signals UE 411 to detach from 5G MMW node 424 and 5G MMW node 424 stops exchanging the user data with UE 411.

Figure 7:
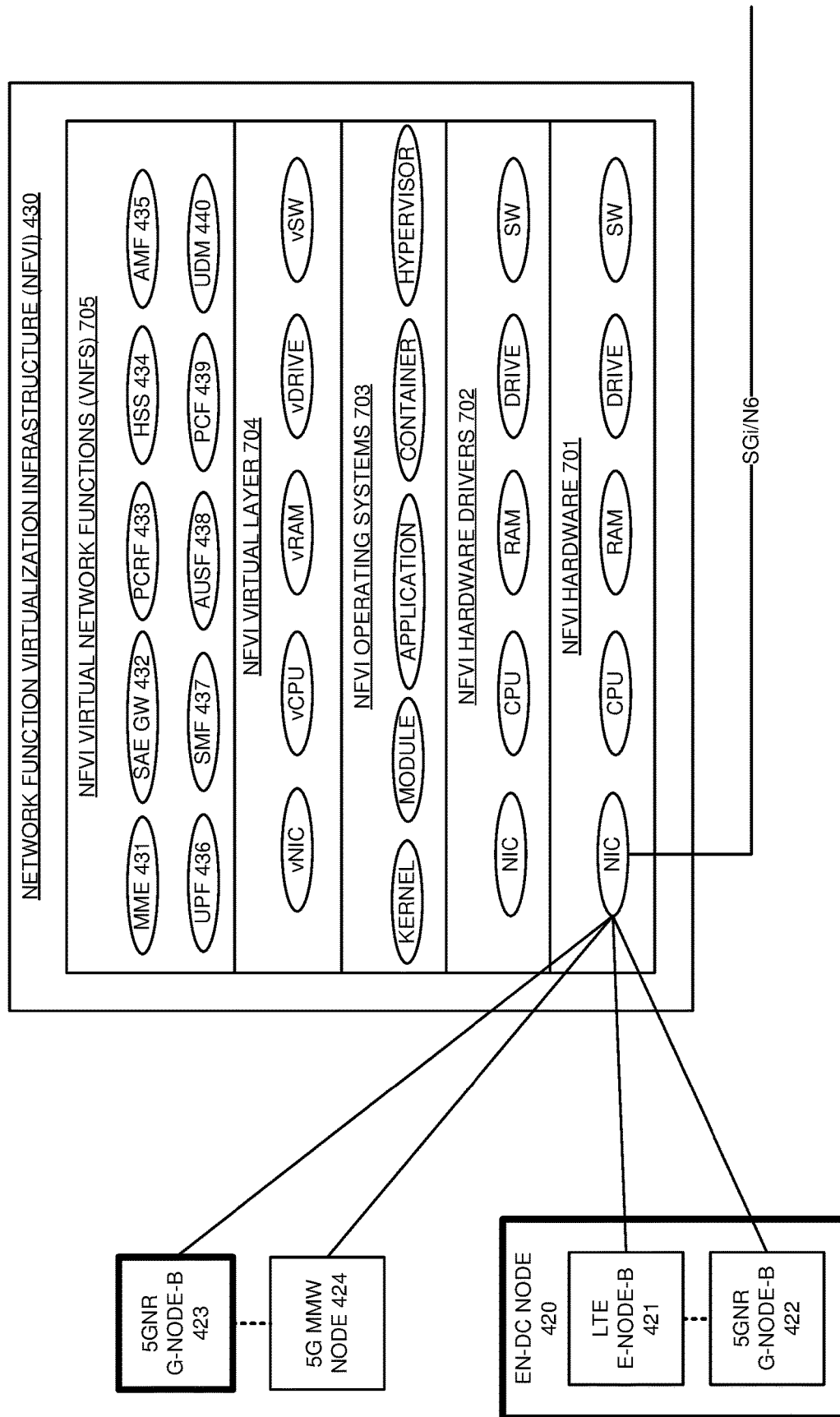
FIG. 7 illustrates a Network Function Virtualization Infrastructure (NFVI) to serve UEs over multiple wireless links based on insertion loss.

FIG. 7 illustrates Network Function Virtualization Infrastructure (NFVI) 430 to serve UEs 410-411 over multiple wireless links based on insertion loss. NFVI 430 is an example of network elements 150, although network elements 150 may differ. NFVI 430 comprises NFVI hardware 701, NFVI hardware drivers 702, NFVI operating systems 703, NFVI virtual layer 704, and NFVI Virtual Network Functions (VNFs) 705. NFVI hardware 701 comprises Network Interface Cards (NIC), CPU, RAM, flash/disk drives, and data switches (SW). NFVI hardware drivers 702 comprise software that is resident in the NIC, CPU, RAM, DRIVE, and SW. NFVI operating systems 703 comprise kernels, modules, applications, containers, hypervisors, and the like. NFVI virtual layer 704 comprises virtual NICs (vNIC), virtual CPUs (vCPU), virtual RAM (vRAM), virtual Drives (vDRIVE), and virtual Switches (vSW). NFVI VNFs 705 comprise MME 431, SAE GW 432, PCRF 433, HSS 434, AMF 435, UPF 436, SMF 437, AUSF 438, PCF 439, and UDM 440. Other LTE VNFs and 5GC VNFs are typically present but are omitted for clarity. The NIC is coupled to EN-DC node 420, 5GNR gNodeB 423, 5G MMW node 424, and to external systems. NFVI hardware 701 executes NFVI hardware drivers 702, NFVI operating systems 703, NFVI virtual layer 704, and NFVI VNFs 705 to serve UEs 410-411 over EN-DC node 420, 5GNR gNodeB 423, and 5G MMW node 424.

MME 431 receives S1-MME signaling from LTE eNodeB 421 that requests data services for UE 410 and indicates 5G capabilities for UE 410. MME 431 interacts with HSS 434 to authenticate and authorize UE 410 for wireless data services that are represented by APNs. In response to the 5G UE capabilities and the authorization MME 431 generates a B1 measurement object for UE 410 that specifies frequencies for UE 410 to measure when establishing duel connectivity. In some examples, the B1 measurement object may specify additional parameters for UE 410 to measure when establishing duel connectivity. MME 431 transfers the APNs for UE 410 to SAE GW 432. SAE GW 432 interacts with PCRF 433 to select QCIs and network addresses for UE 410 based on the APNs. SAE GW 432 transfers the APNs, QCIs, and network addresses to MME 431. MME 431 transfers the APNs, QCIs, network addresses, and B1 measurement object for UE 410 to LTE eNodeB 421. MME 431 receives S1-MME signaling from LTE eNodeB 421 for UE 410. SAE GW 432 exchanges user data for UE 410 with external systems. SAE GW 432 exchanges the user with LTE eNodeB 421 and 5GNR gNodeB 422.

AMF 435 receives N2 signaling from 5GNR gNodeB 423 that requests data service for UE 411 and indicates 5G capabilities for UE 411. AMF 435 interacts with SMF 437, AUSF 438, PCF 439, and UDM 440 to authenticate and authorize 5GNR UE 411 for 5G data services. AMF 435 generates a 5GNR measurement object responsive to the 5G UE capabilities and the authorization that specifies frequencies for UE 411 to measure when establishing duel connectivity. In some examples, the 5GNR measurement object may specify additional parameters for UE 411 to measure when establishing duel connectivity. AMF 435 transfers quality-of-service metrics, network addressing, and the 5GNR measurement object for 5GNR UE 411 to 5GNR gNodeB 423. AMF 436 receives N2 signaling from 5GNR gNodeB 423 indicating the attachments. AMF 435 directs SMF 437 drive UPF 436 to serve UE 411 over 5G MMW node 424 per the quality-of-service metrics and network addressing. SMF 437 directs UPF 436 to serve UE 411 over 5GNR gNodeB 423 per the quality-of-service metrics and network addressing.

Figure 8:
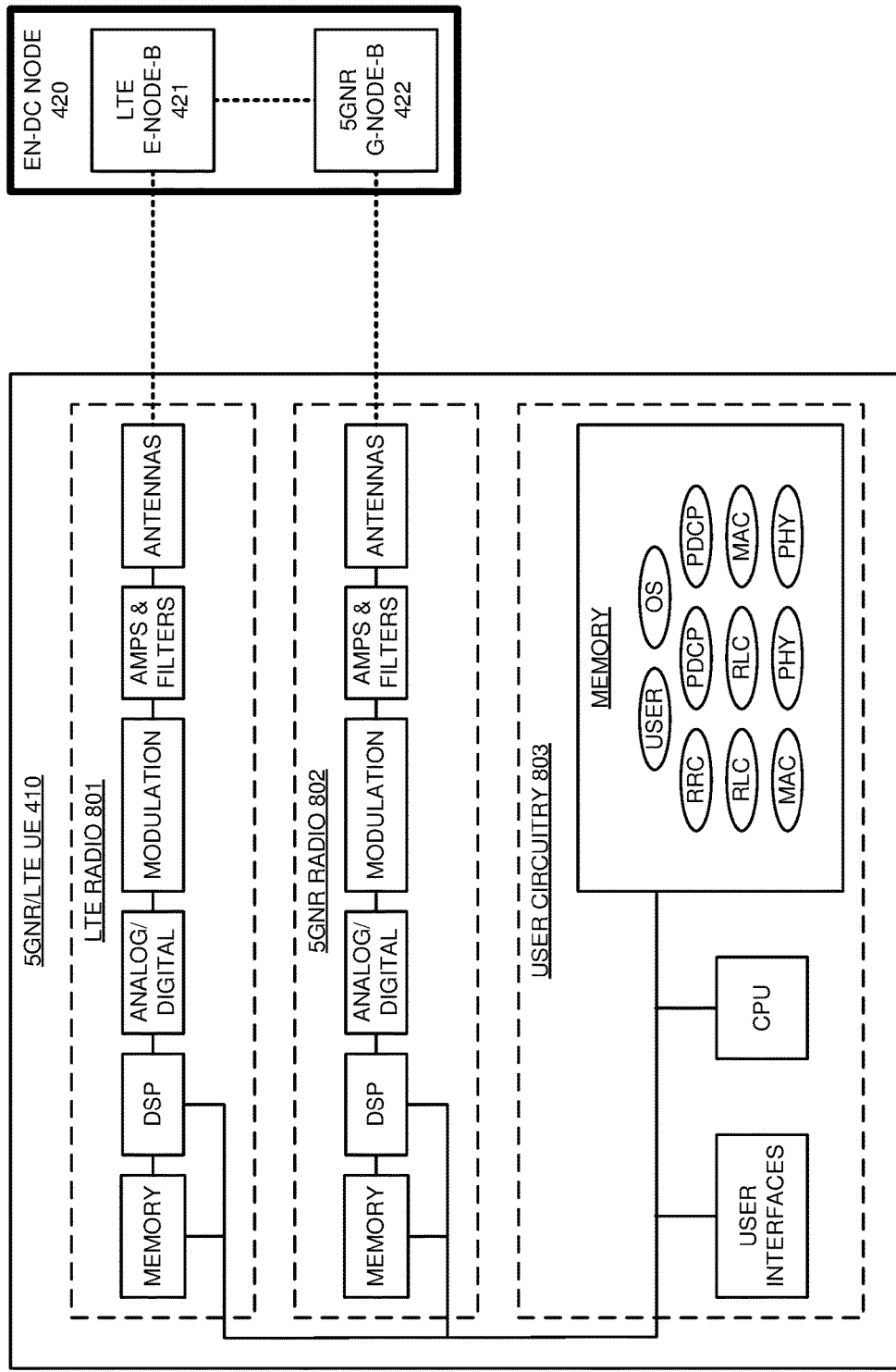
FIG. 8 illustrates the 5GNR/LTE UE that is served by the EN-DC access node over multiple wireless links based on insertion loss.

FIG. 8 illustrates 5GNR/LTE UE 410 that is served by EN-DC access node 420 over multiple wireless links based on insertion loss. 5GNR/LTE UE 410 is an example of UE 101, although UE 101 may differ. UE 410 comprises LTE radio 801, 5GNR radio 802, and user circuitry 803 that are coupled over bus circuitry. Radios 801-802 comprise antennas, amplifiers, filters, modulation, analog-to-digital interfaces, DSP, and memory that are coupled over bus circuitry. User circuitry 803 comprises user interfaces, CPU, and memory that are coupled over bus circuitry.

The antennas in radios 801 and 802 are wirelessly coupled to LTE eNodeB 421 and 5GNR gNodeB 422 respectively. The user interfaces in user circuitry 803 comprise graphic displays, machine controllers, sensors, cameras, transceivers, and/or some other user components. The memory in user circuitry 803 stores an operating system, user applications (USER), and network applications (PHY, MAC, RLC, PDCP, and RRC). The CPU in user circuitry 803 executes the operating system and the user applications to generate and consume user data. The CPU in user circuitry 803 executes the operating system and the network applications to wirelessly exchange corresponding signaling and data with LTE eNodeB 421 and 5GNR gNodeB 422 over radios 801 and 802.

In operation, the LTE RRC in UE 410 wirelessly attaches to LTE eNodeB 421 over antennas in LTE radio 801. The LTE RRC in UE 410 generates UL LTE signaling and UL LTE data. The UL signaling indicates 5G capabilities for UE 410 and the location of UE 410. The LTE network applications in UE 410 process the UL LTE signaling and the UL LTE data to generate corresponding UL LTE symbols that carry the UL LTE signaling and UL LTE data. The LTE DSP in LTE radio 801 processes the UL LTE symbols to generate corresponding digital signals for the analog-to-digital interfaces. The analog-to-digital interfaces convert the digital UL signals into analog UL signals for modulation. Modulation up-converts the UL signals to their carrier frequency. The amplifiers boost the modulated UL signals for the filters which attenuate unwanted out-of-band energy. The filters transfer the filtered UL signals through duplexers to the antennas. The electrical UL signals drive the antennas to emit corresponding wireless LTE signals that transport the UL LTE signaling (indicating the 5G UE capabilities and location) and UL LTE data for UE 410 to LTE eNodeB 421.

The LTE antennas in LTE radio 801 receive wireless DL signals having DL LTE signaling and DL LTE data and transfer corresponding DL signals through duplexers to the amplifiers. The amplifiers boost the received DL signals for filters which attenuate unwanted energy. Demodulators down-convert the DL signals from their carrier frequency. The analog/digital interfaces convert the analog DL signals into digital DL signals for the DSP. The DSP recovers DL LTE symbols from the DL digital signals. The CPUs execute the network applications to process the DL LTE symbols and recover the DL LTE signaling and DL LTE data. The DL LTE signaling indicates a B1 measurement object, APNs, QCIs, and network addresses from LTE eNodeB 421.

In response to the B1 measurement object, the LTE RRC in UE 410 directs the 5GNR PHY to measure 5GNR signal strength of the reference signal from 5GNR gNodeB 422. The 5GNR PHY reports the 5GNR signal strength to the LTE RRC. The LTE RRC in UE 410 generates a measurement report that characterizes the 5GNR signal strength and transfers the measurement report to LTE eNodeB 421 over LTE radio 801. LTE eNodeB 421 determines insertion loss for 5GNR gNodeB 422. LTE eNodeB 421 determines a B1 addition threshold for 5GNR gNodeB 422 based on the insertion loss. LTE eNodeB 421 determines an inter-RAT addition value based on the 5GNR signal strength. When the inter-RAT addition value is greater than the B1 addition threshold, LTE eNodeB 421 directs the 5GNR PDCP in UE 410 to attach to 5GNR gNodeB 422. 5GNR gNodeB 422 exchanges user data for UE 410 with the 5GNR PDCP in UE 410.

In some examples, LTE eNodeB 421 determines a B1 drop threshold for 5GNR gNodeB 422 based on the insertion loss for 5GNR gNodeB 422. The LTE RRC in UE 410 directs the 5GNR PHY to measure subsequent 5GNR signal strength of reference signal from 5GNR gNodeB 422. The 5GNR PHY reports the subsequent signal strength to the LTE RRC. The LTE RRC in UE 410 wirelessly transfers the subsequent 5GNR signal strength to LTE eNodeB 421. LTE eNodeB 421 determines an inter-RAT drop value for 5GNR gNodeB 422 based on the subsequent 5GNR signal strength. When the inter-RAT drop value for 5GNR gNodeB 422 is lower than the B1 drop threshold for 5GNR gNodeB 422, LTE eNodeB 421 signals the 5GNR PDCP in UE 410 to detach from 5GNR gNodeB 422. The 5GNR PDCP in UE 410 detaches from 5GNR gNodeB 422.

Figure 9:
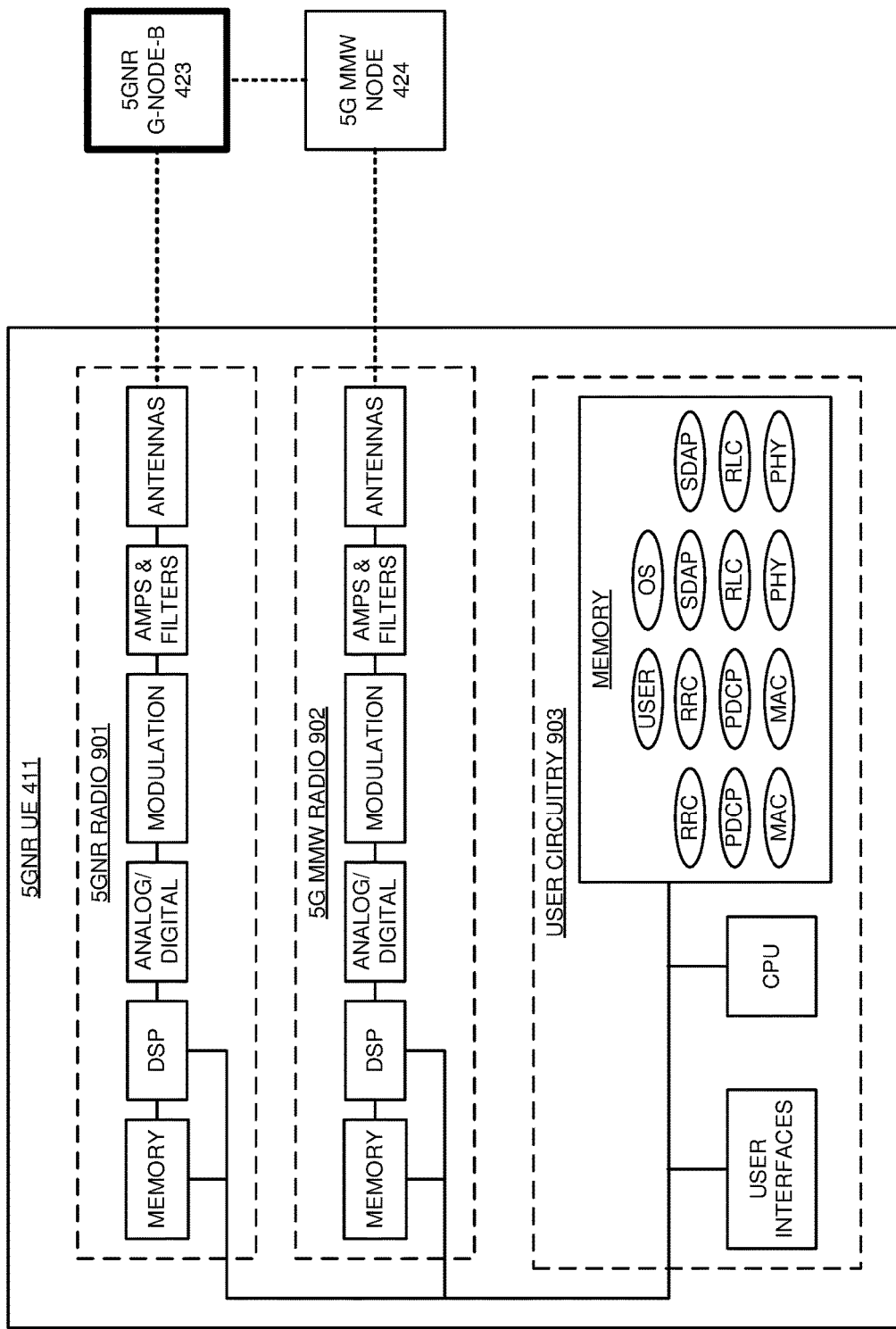
FIG. 9 illustrates the 5GNR UE that is served by the 5GNR gNodeB over multiple wireless links based on insertion loss.

FIG. 9 illustrates 5GNR UE 411 that is served by 5GNR gNodeB 423 based on insertion loss. 5GNR UE 411 is an example of UE 101, although UE 101 may differ. UE 411 comprises 5GNR radio 901, 5G MMW radio 902, and user circuitry 903 that are coupled over bus circuitry. Radios 901-902 comprise antennas, amplifiers, filters, modulation, analog-to-digital interfaces, DSP, and memory that are coupled over bus circuitry. User circuitry 903 comprises user interfaces, CPU, and memory that are coupled over bus circuitry. The antennas in 5GNR radio 901 are wirelessly coupled to 5GNR gNodeB 423. The antennas in 5G MMW radio 902 are wirelessly coupled to 5G MMW node 424. The user interfaces in user circuitry 903 comprise graphic displays, machine controllers, sensors, cameras, transceivers, and/or some other user components. The memory in user circuitry 903 stores an operating system, user applications, and network applications (PHY, MAC, RLC, PDCP, SDAP, and RRC). The CPU in user circuitry 903 executes the operating system and the user applications to generate and consume user data. The CPU in user circuitry 903 executes the operating system and the network applications to wirelessly exchange corresponding signaling and data with 5GNR gNodeB 423 over 5GNR radio 901 and with 5G MMW node 424 over 5G MMW radio 902.

In operation, the 5GNR RRC in UE 411 wirelessly attaches to 5GNR gNodeB 423 over antennas in 5GNR radio 901. The 5GNR RRC generates 5GNR signals that transport UL 5GNR signaling and UL 5GNR data. The 5GNR signaling indicates 5G capabilities for UE 411 and the location of UE 411. The 5GNR network applications in UE 411 process the UL 5GNR signaling and the UL 5GNR data to generate corresponding UL 5GNR symbols that carry the UL 5GNR signaling and UL 5GNR data. The 5GNR DSP in 5GNR radio 901 processes the UL 5GNR symbols to generate corresponding digital signals for the analog-to-digital interfaces. The analog-to-digital interfaces convert the digital UL signals into analog UL signals for modulation. Modulation up-converts the UL signals to their carrier frequency. The amplifiers boost the modulated UL signals for the filters which attenuate unwanted out-of-band energy. The filters transfer the filtered UL signals through duplexers to the antennas. The electrical UL signals drive the antennas to emit corresponding wireless 5GNR signals that transport the UL 5GNR signaling (indicating the 5G capabilities and location) and UL 5GNR data for UE 411 to 5GNR gNodeB 423.

The 5GNR antennas 5GNR radio 901 receive wireless DL signals that have DL 5GNR signaling, DL 5GNR data, and a 5GNR measurement object and transfer corresponding DL signals through duplexers to the amplifiers. The amplifiers boost the received DL signals for filters which attenuate unwanted energy. Demodulators down-convert the DL signals from their carrier frequency. The analog/digital interfaces convert the analog DL signals into digital DL signals for the DSP. The DSP recovers DL 5GNR symbols from the DL digital signals. The CPUs in UE 411 execute the network applications to process the DL 5GNR symbols and recover the DL 5GNR signaling having the 5GNR measurement object, QoS levels, network addresses, and the like and the DL 5GNR data.

In response to the 5GNR measurement object, the 5GNR RRC in UE 411 directs the MMW PHY in UE 411 to measure MMW signal strength of the reference signal for 5G MMW node 424. The MMW PHY reports the signal strength to the 5GNR RRC. The 5GNR RRC wirelessly transfers a measurement report that characterizes the signal strength for 5G MMW node 424 to 5GNR gNodeB 423. 5GNR gNodeB 423 determines insertion loss for 5G MMR node 424. 5GNR gNodeB 423 determines an inter-RAT add threshold for 5G MMW node 424 based on the insertion loss. 5GNR gNodeB 423 determines an inter-RAT add value for 5G MMW node 424 based on the reported signal strength. When the inter-RAT addition value is greater than the inter-RAT addition threshold for 5G MMW node 424, 5GNR gNodeB 423 directs the MMW RRC in UE 411 to attach to 5G MMW node 424. The MMW RRC in 5GNR UE 411 attaches to 5G MMW node 424 over 5G MMW radio 902. 5G MMW node 424 exchanges user data with the MMW SDAP in UE 411 and MMW signaling with the MMW RRC in UE 411.

In some examples, the 5GNR RRC in UE 411 directs the 5G MMW PHY in UE 411 to measure subsequent signal strength of the reference signal for 5G MMW node 424. The MMW PHYs report the subsequent MMW signal strength to the 5GNR RRC. The 5GNR RRC wirelessly transfers a measurement report that characterizes the subsequent signal strength to 5GNR gNodeB 423. 5GNR gNodeB 423 determines an inter-RAT drop value for 5G MMW node 424 based on the insertion loss. 5GNR gNodeB 423 determines an inter-RAT drop value based on the subsequent signal strength. When the drop value is lower than the drop threshold for MMW node 424, the 5GNR RRC in 5GNR gNodeB 423 signals the MMW RRC in UE 411 to detach from 5G MMW node 424. 5G MMW node 424 to stops exchanging the user data with UE 411.

Figure 10:
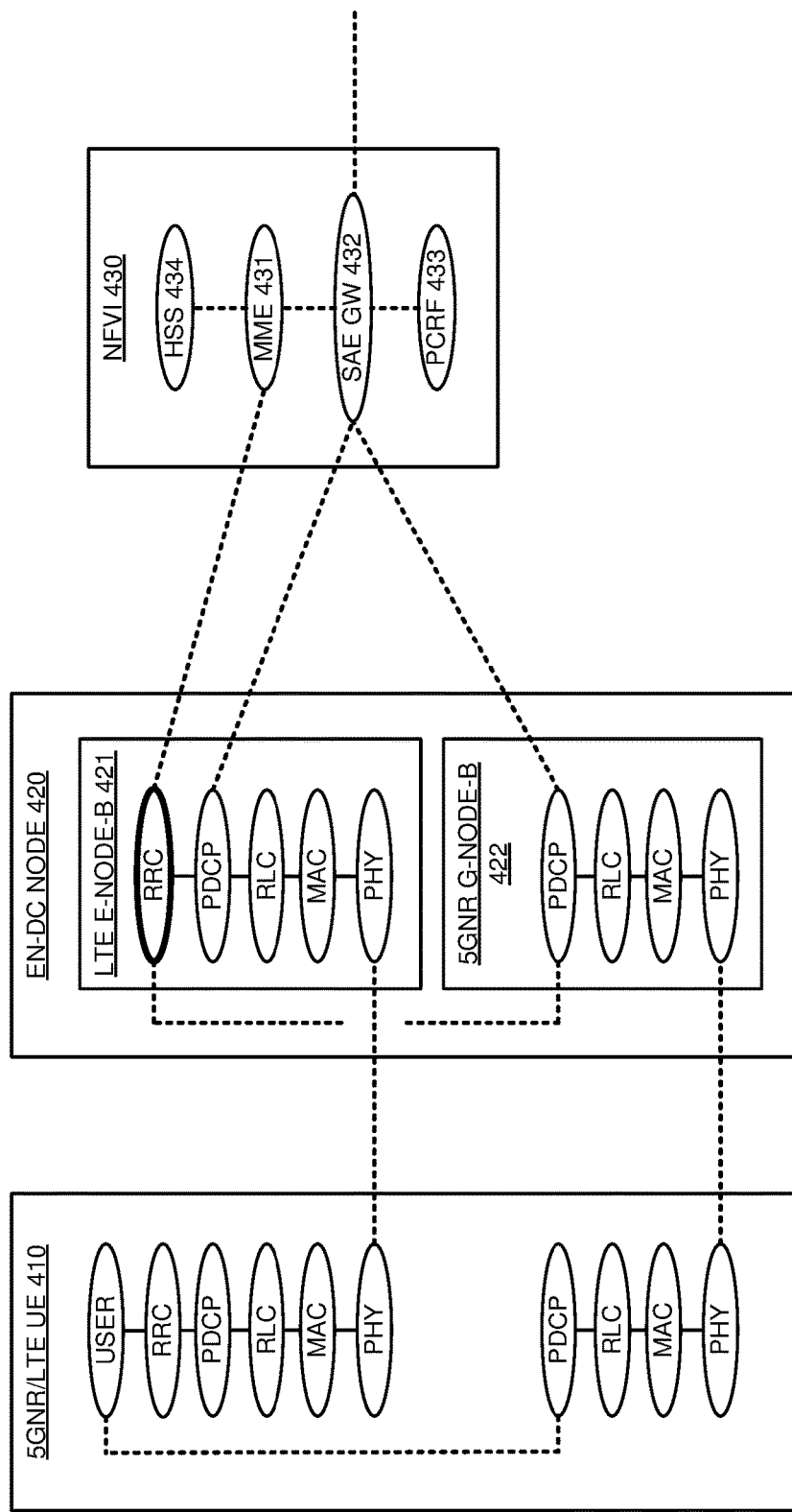
FIG. 10 illustrates an exemplary operation of the 5GNR/LTE UE, the EN-DC access node, and the NFVI to serve the 5GNR/LTE UE over multiple wireless links based on insertion loss.

FIG. 10 illustrates an exemplary operation of 5GNR/LTE UE 410, EN-DC access node 420, and NFVI 430 to serve 5GNR/LTE UE 410 over multiple wireless links based on insertion loss. In 5GNR/LTE UE 410, a user application requests data communication, and the LTE RRC in UE 410 attaches to the LTE RRC in LTE eNodeB 421 over the LTE PDCPs, RLCs, MACs, and PHYs. The LTE RRC in UE 410 indicates 5G capabilities for UE 410 and the location of UE 410 to the LTE RRC in LTE eNodeB 421. The LTE RRC in LTE eNodeB 421 transfers S1-MME signaling to MME 431 that requests data services and indicates the 5G capabilities for UE 410.

MME 431 interacts with HSS 434 to authenticate and authorize UE 410 for wireless data services by APNs. In response to the 5G authorization and the 5G capabilities, MME 431 generates a B1 measurement object for UE 410 that specifies frequencies for UE 410 to measure when establishing duel connectivity. MME 431 transfers the APNs for UE 410 to SAE GW 432. SAE GW 432 interacts with PCRF 433 to select QCIs and network addresses for UE 410 based on the APNs. SAE GW 432 transfers the APNs, QCIs, and addresses to MME 431. MME 431 transfers the APNs, QCIs, network address, and the B1 measurement object for UE 410 to the LTE RRC in LTE eNodeB 421. The LTE RRC in LTE eNodeB 421 transfers the APNs, QCIs, network address, and B1 measurement object to the LTE RRC in UE 410 over the PDCPs, RLCs, MACs, and PHYs. SAE GW 432 exchanges the user data with the PDCP in LTE eNodeB 421. The PDCP in LTE eNodeB 421 exchanges the user data with the LTE PDCP in UE 410 over the RLCs, MACs, and PHYs.

In response to the B1 measurement object, the LTE RRC in UE 410 directs the 5GNR PHY to measure 5GNR signal strength of the reference signal for 5GNR gNodeB 422. The 5GNR PHY reports the signal strength to the LTE RRC in UE 410. The LTE RRC in UE 410 transfers a measurement report that characterizes the 5GNR signal strength to the LTE RRC in LTE eNodeB 421. The LTE RRC in LTE eNodeB 421 determines insertion loss for 5GNR gNodeB 422. The LTE RRC in LTE eNodeB 421 determines a B1 addition threshold for 5GNR gNodeB 422 based on the insertion loss. The LTE RRC in LTE eNodeB 421 determines frequency offset and hysteresis for 5GNR gNodeB 422. The LTE RRC in LTE eNodeB 421 determines an inter-RAT addition value for 5GNR gNodeB 422 based on the 5GNR signal strength, the frequency offset, and the hysteresis. The LTE RRC in LTE eNodeB 421 determines when the inter-RAT addition value is greater than the B1 addition threshold. When the inter-RAT addition value for 5GNR gNodeB 422 is greater than the B1 addition threshold for 5GNR gNodeB 422, the LTE RRC in LTE eNodeB 421 directs the 5GNR PDCP in 5GNR gNodeB 422 to serve UE 410. The LTE RRC in eNodeB 421 directs the 5GNR PDCP in UE 410 to attach to the 5GNR PDCP in 5GNR gNodeB 422 over the 5GNR RLCs, MACs, and PHYs. The 5GNR PDCP attaches to the 5GNR PDCP in 5GNR gNodeB 422.

The PDCP in 5GNR gNodeB 422 requests 5GNR service for UE 410 from the LTE RRC in LTE eNodeB 421 over X2 signaling. The LTE RRC in LTE eNodeB 421 requests the 5GNR service for UE 410 from MME 431 over S1-MME signaling. MME 431 directs SAE GW 432 to serve UE 410 over 5GNR gNodeB 422. MME 431 transfers the APNs, QCIs, and network address for UE 410 to the RRC in LTE eNodeB 421. The LTE RRC in LTE eNodeB 421 transfers the APNs, QCIs, and network address to the 5GNR PDCP in 5GNR gNodeB 422 over X2 signaling. The PDCP in 5GNR gNodeB 422 transfers the APNs, QCIs, and network address to the PDCP in UE 410 over the RLCs, MACs, and PHYs. SAE GW 432 exchanges user data for UE 410 with external systems. SAE GW 431 exchanges the user data with the PDCP in 5GNR gNodeB 422. The 5GNR PDCP in 5GNR gNodeB 422 exchanges the user data with the 5GNR PDCP in UE 410 over the RLCs, MACs, and PHYs.

Figure 11:
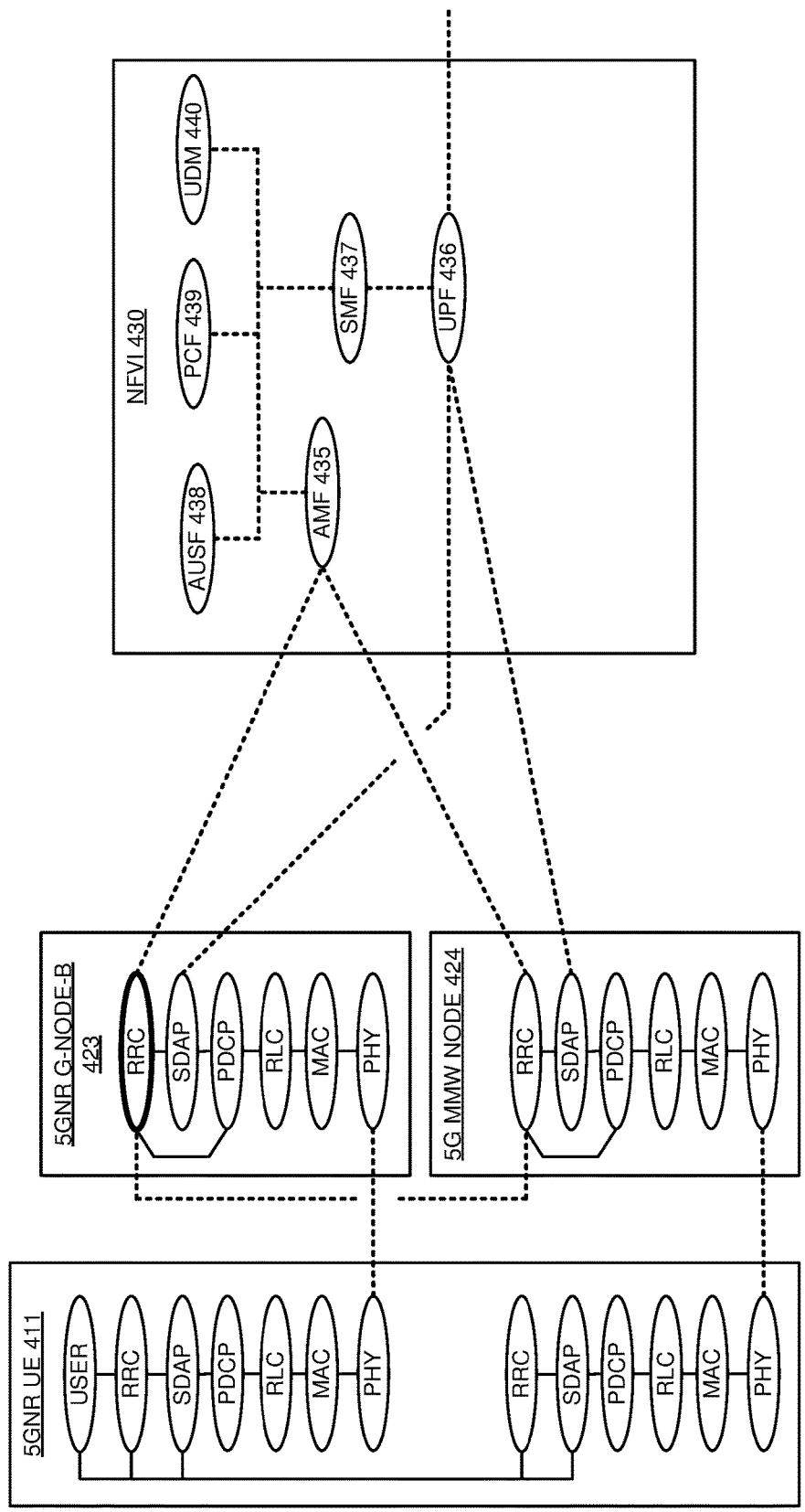
FIG. 11 illustrates an exemplary operation of the 5GNR UE, the 5GNR gNodeB, a 5G MMW access node, and the NFVI to serve the 5GNR UE over multiple wireless links based on insertion loss.

FIG. 11 illustrates an exemplary operation of UE 411, 5GNR gNodeB 423, 5G MMW node 424, and NFVI 430 to serve UE 411 over multiple wireless links based on insertion loss. In 5GNR UE 411, a user application requests data communication, and the 5GNR RRCs in UE 411 attach to the 5GNR RRC in 5GNR gNodeB 423 over the 5GNR PDCPs, RLCs, MACs, and PHYs. The 5GNR RRC in UE 411 indicates 5G UE capabilities and the location of UE 411 to the 5GNR RRC in 5GNR gNodeB 423. The 5GNR RRC in 5GNR gNodeB 423 sends a request for data services for 5GNR UE 411 in N2 signaling to AMF 435 over the backhaul links. AMF 435 interacts with SMF 437, AUSF 438, PCF 439, UDM 440, and typically other functions to authenticate and authorize 5GNR UE 411 for 5G data services. SMF 437 directs UPF 436 to serve UE 411 per the quality-of-service metrics and network addressing. AMF 435 generates a 5GNR measurement object for UE 411 responsive to the 5G authorization and 5G UE capabilities that specifies frequencies for UE 411 to measure when establishing duel connectivity. AMF 435 transfers quality-of-service metrics, network addressing, and the 5GNR measurement object for UE 411 to the 5GNR RRC in 5GNR gNodeB 423 in N2 signaling. The 5GNR RRC in 5GNR gNodeB 423 transfers the selected APNs, QCIs, network addresses, and 5GNR measurement object to the 5GNR RRC in UE 411 over the PDCPs, RLCs, MACs, and PHYs.

In response to the 5GNR measurement object, the 5GNR RRC in UE 411 directs the MMW PHY to measure the signal strength for 5G MMW node 424. The MMW PHY reports the signal strength to the 5GNR RRC in UE 411. The 5GNR RRC generates a measurement report charactering the signal strength and wirelessly transfers the measurement report to the 5GNR RRC in 5GNR gNodeB 423 over the PDCPs, RLCs, MACs, and PHYs. The 5GNR RRC in 5GNR gNodeB 423 determines insertion loss for 5G MMW node 424. 5GNR RRC in 5GNR gNodeB 423 determines an inter-RAT addition threshold for 5G MMW node 424 based on the insertion loss.

The 5GNR RRC in 5GNR gNodeB 423 determines the frequency offset, and the hysteresis for 5G MMW node 424. The 5GNR RRC in 5GNR gNodeB 423 determines an inter-RAT addition value for 5G MMW node 424 based on the MMW signal strength, the frequency offset, and the hysteresis. The 5GNR RRC in 5GNR gNodeB 423 determines when the inter-RAT addition value is greater than the inter-RAT addition threshold. When the inter-RAT addition value is greater than the inter-RAT addition threshold for 5G MMW node 424, the 5GNR RRC in 5GNR gNodeB 423 directs the MMW RRC in 5G MMW node 424 to serve UE 411. The 5GNR RRC in 5GNR gNodeB 423 directs UE 411 to attach to 5G MMW node 424. The MMW RRC in UE 411 attaches to the RRC in 5G MMW node 424 over the PDCPs, RLCs, MACs, and PHYs. The MMW RRC in 5G MMW node 424 requests MMW service for UE 411 from AMF 435. UPF 436 exchanges user data for UE 411 with external systems. UPF 436 exchanges the user data with the SDAPs in 5G MMW node 424. The SDAPs in 5G MMW node 424 exchange the user data with the SDAPs in 5GNR UE 411 over the PDCPs, RLCs, MACs, and PHYs. The SDAPs in UE 411 exchange the user data with the user applications.

The wireless data network circuitry described above comprises computer hardware and software that form special-purpose network circuitry to serve wireless UEs over multiple wireless links based on insertion loss. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to serve wireless UEs based on insertion loss.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method for operating a primary access node to add a secondary access node to deliver wireless communication service to a User Equipment (UE), the method comprising:
    a radio wirelessly receiving a measurement report from the UE that characterizes a radio metric for the secondary access node and transferring the measurement report to a baseband circuitry;
    the baseband circuitry determining an insertion loss for the secondary access node, determining an add threshold for the secondary access node based on the insertion loss, receiving and processing the measurement report and responsively determining an add value for the secondary access node based on the radio metric in the measurement report, and determining when the add value exceeds the add threshold;
    when the add value exceeds the add threshold, the baseband circuitry transferring network signaling to the secondary access node to serve the UE and transferring user signaling to the radio;
    the radio wirelessly transferring the user signaling to the UE to attach to the secondary access node, wherein the UE attaches to the secondary access node responsive to the user signaling and the secondary access node delivers the wireless communication service to the UE responsive to the network signaling.

2. The method of claim 1 further comprising the baseband circuitry determining a front radio lobe power for the secondary access node, determining a back radio lobe power for the secondary access node, determining a radio lobe power ratio for the secondary access node, and determining the add threshold based on the radio lobe power ratio.

3. The method of claim 1 further comprising the baseband circuitry determining a radio port isolation loss for the secondary access node and determining the add threshold based on the radio port isolation loss.

4. The method of claim 1 further comprising the baseband circuitry determining an antenna gain for the secondary access node and determining the add threshold based on the antenna gain.

5. The method of claim 1 wherein the baseband circuitry determining the insertion loss, determining the add threshold based on the insertion loss, determining the add value, determining when the add value exceeds the add threshold, and transferring the network signaling to the secondary access node comprises the baseband circuitry executing a Long Term Evolution (LTE) Radio Resource Control (RRC) and the LTE RRC determining the insertion loss, determining the add threshold based on the insertion loss, determining the add value, determining when the add value exceeds the add threshold, and transferring the network signaling to the secondary access node.

6. The method of claim 1 wherein the baseband circuitry determining the insertion loss, determining the add threshold based on the insertion loss, determining the add value, determining when the add value exceeds the add threshold, and transferring the network signaling to the secondary access node comprise the baseband circuitry executing a Fifth Generation New Radio (5GNR) Radio Resource Control (RRC) and the 5GNR RRC determining the insertion loss, determining the add threshold based on the insertion loss, determining the add value, determining when the add value exceeds the add threshold, and transferring the network signaling to the secondary access node.

7. The method of claim 1 wherein the baseband circuitry determining the add threshold comprises the baseband circuitry determining a B1 addition threshold.

8. The method of claim 1 wherein the baseband circuitry determining the add threshold comprises the baseband circuitry determining a 5GNR inter Radio Access Technology (inter-RAT) addition threshold.

9. The method of claim 1 wherein the primary access node comprises an LTE eNodeB and the secondary access node comprises a 5GNR gNodeB.

10. The method of claim 1 wherein the primary access node comprises a 5GNR gNodeB and the secondary access node comprises a Fifth Generation Millimeter Waver (5G MMW) access node.

11. A primary access node configured to add a secondary access node to deliver wireless communication service to a User Equipment (UE), the primary access node comprising:
    a radio configured to wirelessly receive a measurement report from the UE that characterizes a radio metric for the secondary access node and transfer the measurement report to a baseband circuitry;
    the baseband circuitry configured to determine an insertion loss for the secondary access node, determine an add threshold for the secondary access node based on the insertion loss, receive and process the measurement report and responsively determine an add value for the secondary access node based on the radio metric in the measurement report, and determine when the add value exceeds the add threshold;
    when the add value exceeds the add threshold, the baseband circuitry configured to transfer network signaling to the secondary access node to serve the UE and transfer user signaling to the radio;
    the radio configured to wirelessly transfer the user signaling to the UE to attach to the secondary access node, wherein the UE attaches to the secondary access node responsive to the user signaling and the secondary access node delivers the wireless communication service to the UE responsive to the network signaling.

12. The primary access node of claim 11 further comprising the baseband circuitry configured to determine a front radio lobe power for the secondary access node, determine a back radio lobe power for the secondary access node, determine a radio lobe power ratio for the secondary access node, and determine the add threshold based on the radio lobe power ratio.

13. The primary access node of claim 11 further comprising the baseband circuitry configured to determine a radio port isolation loss for the secondary access node and determine the add threshold based on the radio port isolation loss.

14. The primary access node of claim 11 further comprising the baseband circuitry configured to determine an antenna gain for the secondary access node and determine the add threshold based on the antenna gain.

15. The primary access node of claim 11 wherein the baseband circuitry configured to determine the insertion loss, determine the add threshold based on the insertion loss, receive and process the measurement report, determine the add value, determine when the add value exceeds the add threshold, and transfer the network signaling to the secondary access node comprises the baseband circuitry configured to execute a Long Term Evolution (LTE) Radio Resource Control (RRC) and the LTE RRC configured to determine the insertion loss, determine the add threshold based on the insertion loss, receive and process the measurement report, determine the add value, determine when the add value exceeds the add threshold, and transfer the network signaling to the secondary access node.

16. The primary access node of claim 11 wherein the baseband circuitry configured to determine the insertion loss, determine the add threshold based on the insertion loss, receive and process the measurement report, determine the add value, determine when the add value exceeds the add threshold, and transfer the network signaling to the secondary access node comprises the baseband circuitry configured to execute a Fifth Generation New Radio (5GNR) Radio Resource Control (RRC) and the 5GNR RRC configured to determine the insertion loss, determine the add threshold based on the insertion loss, receive and process the measurement report, determine the add value, determine when the add value exceeds the add threshold, and transfer the network signaling to the secondary access node.

17. The primary access node of claim 11 wherein the baseband circuitry configured to determine the add threshold comprises the baseband circuitry configured to determine a B1 addition threshold.

18. The primary access node of claim 11 wherein the baseband circuitry configured to determine the add threshold comprises the baseband circuitry configured to determine a 5GNR inter Radio Access Technology (inter-RAT) addition threshold.

19. The primary access node of claim 11 wherein the primary access node comprises an LTE eNodeB and the secondary access node comprises a 5GNR gNodeB.

20. The primary access node of claim 11 wherein the primary access node comprises a 5GNR gNodeB and the secondary access node comprises a Fifth Generation Millimeter Wave (5G MMW) access node.

* * * * *